(12) United States Patent
Fourie

(10) Patent No.: US 10,780,648 B1
(45) Date of Patent: Sep. 22, 2020

(54) AUTOMATED BALLOON ASSEMBLY MACHINE

(71) Applicant: Loon LLC, Mountain View, CA (US)

(72) Inventor: Daniel Henry Fourie, Sunnyvale, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/563,137

(22) Filed: Sep. 6, 2019

Related U.S. Application Data

(60) Continuation of application No. 16/113,539, filed on Aug. 27, 2018, now Pat. No. 10,456,990, which is a division of application No. 15/080,027, filed on Mar. 24, 2016, now Pat. No. 10,086,561.

(51) Int. Cl.
*B29C 65/78* (2006.01)
*B29C 65/00* (2006.01)
*B29L 22/02* (2006.01)

(52) U.S. Cl.
CPC ...... *B29C 65/7802* (2013.01); *B29C 65/7847* (2013.01); *B29C 66/836* (2013.01); *B29L 2022/022* (2013.01)

(58) Field of Classification Search
CPC ....... B29C 65/18; B29C 65/226; B29C 65/30; B29C 65/743; B29C 65/7802; B29C 65/7847; B29C 66/0044; B29C 66/1122; B29C 66/133; B29C 66/244; B29C 66/3452; B29C 66/836; B29C 66/86533;
(Continued)

(56) References Cited

U.S. PATENT DOCUMENTS

| 2,635,671 | A | * | 4/1953 | La Mere | .................. B64B 1/58 156/539 |
|---|---|---|---|---|---|
| 2,656,293 | A | | 10/1953 | Huch | |
| 2,666,600 | A | | 1/1954 | Huch et al. | |

(Continued)

FOREIGN PATENT DOCUMENTS

| CN | 1241515 A | 1/2000 |
|---|---|---|
| CN | 102178996 A | 9/2011 |
| JP | H0956934 A | 3/1997 |

OTHER PUBLICATIONS

"Office Action received for Chinese Patent Application No. 201480075881.1, dated Feb. 16, 2017", 11 pages (6 pages of English Translation and 5 pages of Official copy).

(Continued)

*Primary Examiner* — George R Koch
(74) *Attorney, Agent, or Firm* — Botos Churchill IP Law

(57) ABSTRACT

An assembly for manufacturing a balloon envelope includes a table component and a sealing component. The table component may include a first platform, a second platform, a third platform, and a lateral opening between the first and second platforms. The first and second platforms can receive a first sheet of material that forms a first gore of the balloon envelope and a second sheet of material that forms a second gore of the balloon envelope. At least a portion of the first platform may move relative to the third platform so as to allow for the tendon and the portion of the second sheet attached to the tendon to move toward the third platform. The sealing component may be configured to bond the first sheet to the second sheet in order to join the first and the second gores of the balloon envelope.

19 Claims, 16 Drawing Sheets

(58) Field of Classification Search
CPC .. B29C 66/9672; B29L 2022/022; B64B 1/14; B64B 1/58
See application file for complete search history.

(56) References Cited

U.S. PATENT DOCUMENTS

| | | | |
|---|---|---|---|
| 2,679,224 A | 5/1954 | Sturtevant | |
| 2,703,769 A | 3/1955 | Stinger et al. | |
| 2,767,941 A | 10/1956 | Gegner et al. | |
| 2,790,479 A | 4/1957 | Mastenbrook | |
| 2,929,082 A | 3/1960 | Schultz et al. | |
| 3,047,252 A | 7/1962 | Huch et al. | |
| 3,149,017 A | 9/1964 | Ehrreich et al. | |
| 3,269,884 A | 8/1966 | Slater | |
| 3,369,954 A | 2/1968 | Fener | |
| 3,558,083 A | 1/1971 | Conley et al. | |
| 4,662,134 A | 5/1987 | Illgner | |
| 4,705,235 A | 11/1987 | Regipa | |
| 4,713,047 A | 12/1987 | Klinkel | |
| 4,795,520 A | 1/1989 | Klabius et al. | |
| 4,877,205 A | 10/1989 | Rand | |
| 4,911,380 A | 3/1990 | Regipa et al. | |
| 5,061,331 A | 10/1991 | Gute | |
| 9,027,874 B1 | 5/2015 | Roach | |
| 9,027,877 B1 | 5/2015 | Brookes | |
| 9,174,719 B1 | 11/2015 | Roach et al. | |
| 9,221,531 B1 | 12/2015 | Brookes | |
| 9,242,712 B1 | 1/2016 | Ratner | |
| 9,371,123 B2 * | 6/2016 | Roach | B64B 1/58 |
| 10,086,561 B1 * | 10/2018 | Fourie | B29C 66/836 |
| 2009/0002257 A1 | 1/2009 | De Jong et al. | |
| 2011/0083784 A1 | 4/2011 | Henry et al. | |
| 2011/0108612 A1 | 5/2011 | Nickell et al. | |
| 2014/0238600 A1 | 8/2014 | Mahn | |
| 2015/0174817 A1 * | 6/2015 | Roach | B64B 1/58 156/64 |
| 2016/0263815 A1 | 9/2016 | Roach et al. | |

OTHER PUBLICATIONS

Morris, Alvin L, "Scientific Ballooning Handbook", NCAR Technical Note, Atmospheric Technology Division, National Center for Atmospheric Research, May 1975, 258 pages.

Scott , et al., "Long Duration Balloon Technology Survey", Final Report: Report No. WII-9942-01-TR-01. Wizen International, Inc., Available online at: <http://www.dtic.mil/dtic/tr/fulltext/u2/a206975.pdf>, Mar. 11, 1989, 66 pages.

Winker, J. A, "Pumpkins and Onions and Balloon Design", Advances in Space Research, vol. 30, No. 5, 2002, pp. 1199-1204.

Yajima, N. , "A New Design and Fabrication Approach for Pressurized Balloon", Advances in Space Research, vol. 26, No. 9, 2000, pp. 1357-1360.

"International Search Report and Written Opinion received for PCT Patent Application No. PCT/US2014/069933, dated Mar. 31, 2015", 8 pages.

"Notice of Acceptance received for Australian Patent Application No. 2014366305, dated Feb. 9, 2017", 3 pages.

* cited by examiner

AUTOMATED BALLOON ASSEMBLY MACHINE

CROSS-REFERENCE TO RELATED APPLICATIONS

The present application is a continuation of U.S. application Ser. No. 16/113,539, filed Aug. 27, 2018, issued as U.S. Pat. No. 10,456,990, which is a divisional of U.S. patent application Ser. No. 15/080,027, filed on Mar. 24, 2016, issued as U.S. Pat. No. 10,086,561, on Oct. 2, 2018, the disclosures of which are incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, and a plurality of tendons to support the lobes.

Typically, these components of the balloon envelope are assembled before the balloon can take flight. When this assembly technique is performed manually, the efforts can become extremely time-consuming and lack consistency.

BRIEF SUMMARY

One aspect of the present disclosure is directed to an assembly for manufacturing a balloon envelope. The assembly includes a table component and a sealing component. The table component includes a first platform, a second platform, a third platform, and a lateral opening extending between the first platform and the second platform. The third platform can be exposed through the lateral opening. The first platform and the second platform may be arranged to receive a first sheet portion of material that will form a first gore of the balloon envelope and a second sheet portion of material that will form a second gore of the balloon envelope. The first platform may be further adapted to receive a tendon secured to a portion of the second sheet portion. At least a portion of the first platform overlying the third platform may be configured to move relative to the third platform so as to allow for the tendon and the portion of the second sheet attached to the tendon to move toward the third platform. The sealing component may be configured to move along the second platform and to apply a heat seal to bond the first sheet portion to the second sheet portion in order to join the first and the second gores of the balloon envelope.

In one example of this aspect, a top surface of the second platform may be positioned between a top surface of the first platform and a top surface of the second platform. The top surface of the second platform may further extend along a horizontal plane that is parallel to the top surface of the first platform.

In another example of this aspect, the at least a portion of the first platform is a movable platform having a free end that overlies the third platform, and the first platform is configured to increase a size of the opening between the first and second platforms. The movable extension may move in a direction toward the third platform. The first platform can further include a main body and a recess within the main body, and the movable extension may be configured to be positioned within the recess of the main body.

In still another example of this aspect, the second platform may be movable relative to the first platform. The second platform may be configured to allow for bonded portions of the first sheet portion and the second sheet portion to move toward the third platform.

According to another aspect of the disclosure, a system for automated folding of a gore of a balloon envelope is disclosed. The system may comprise a balloon having a balloon envelope; and an assembly for use during manufacture of the balloon envelope. The assembly may include a table component and a sealing component. The table component may have a first platform, a second platform, a third platform, and a lateral opening extending between the first platform and the second platform. The third platform may be exposed through the lateral opening. The first platform and the second platform may be arranged to receive a first sheet portion of material that will form a first gore of the balloon envelope and a second sheet portion of material that will form a second gore of the balloon envelope. The first platform may be further adapted to receive a tendon secured to the second sheet portion. At least a portion of the first platform overlying the third platform and configured to move relative to the second platform so as to increase a size of the opening between the first platform and the second platform and allow for the tendon and the portion of the second sheet attached to the tendon to move toward the third platform. The sealing component may be configured to move along the second platform and to apply a heat seal to bond the first sheet portion to the second sheet portion in order to join the first and the second gores of the balloon envelope.

In another example of this aspect, a top surface of the first platform and a top surface of the second platform extend along a same plane. Alternatively, a top surface of the second platform may extend along a plane that is positioned between a top surface of the first platform and a top surface of the third platform.

In still another example of this aspect, the first platform further includes a movable extension having a free end that overlies the third platform. The movable extension may be configured to move in a direction toward the third platform.

In another example, the second platform may be configured to move relative to the first platform so as to increase a size of the lateral opening and to allow heat sealed portions of the first sheet portion and the second sheet portion to move towards the third platform.

Another aspect of the present disclosure is directed to a method for assembling a balloon assembly. The method includes providing a first sheet of material; positioning a second sheet of material across a first platform, the second platform, and an opening extending between the first and second platforms of the table component so that a first end of the second sheet material overlies at least a portion of the first sheet of material that overlies the second platform and a second end of the second sheet material overlies the first platform; securing a tendon on a portion of the second sheet of material overlying the first platform; heat sealing the first sheet of material and the second sheet of material together on the second platform; moving the second end of the second sheet of material from the first platform to the second platform by moving the second end over the tendon; and moving at least a portion of the first platform to transfer the tendon and the portion of the second sheet of material to the third platform. The first sheet of material may extend from a second platform of a table component to a third platform of the table component.

In one example of this aspect, the first platform may further comprise a movable extension. Securing the tendon may further include securing the tendon on a portion of the second sheet of material overlying the movable extension. The movable extension may be moved to increase the size of the opening and so that the tendon is no longer supported by the movable extension.

In another example of this aspect, the heat sealed portion may be transferred to the third platform by moving the second platform so that the first and second sheets of materials are no longer supported by the second platform.

In still another example, the first and second sheets of material may be clamped together while positioned on the second platform. The second platform can further include an airflow unit. The airflow unit may be configured to allow an amount of airflow to temporarily hold portions of the first and second sheets of material overlying the second platform to the second platform.

In yet another example of this aspect, after the second end of the second sheet of material is moved to the second platform, a third sheet of material may be provided that extends across the first platform, the second platform and the opening. The third sheet of material may overlie a portion of the second sheet of material that overlies the second platform.

DETAILED DESCRIPTION

Figure 1:
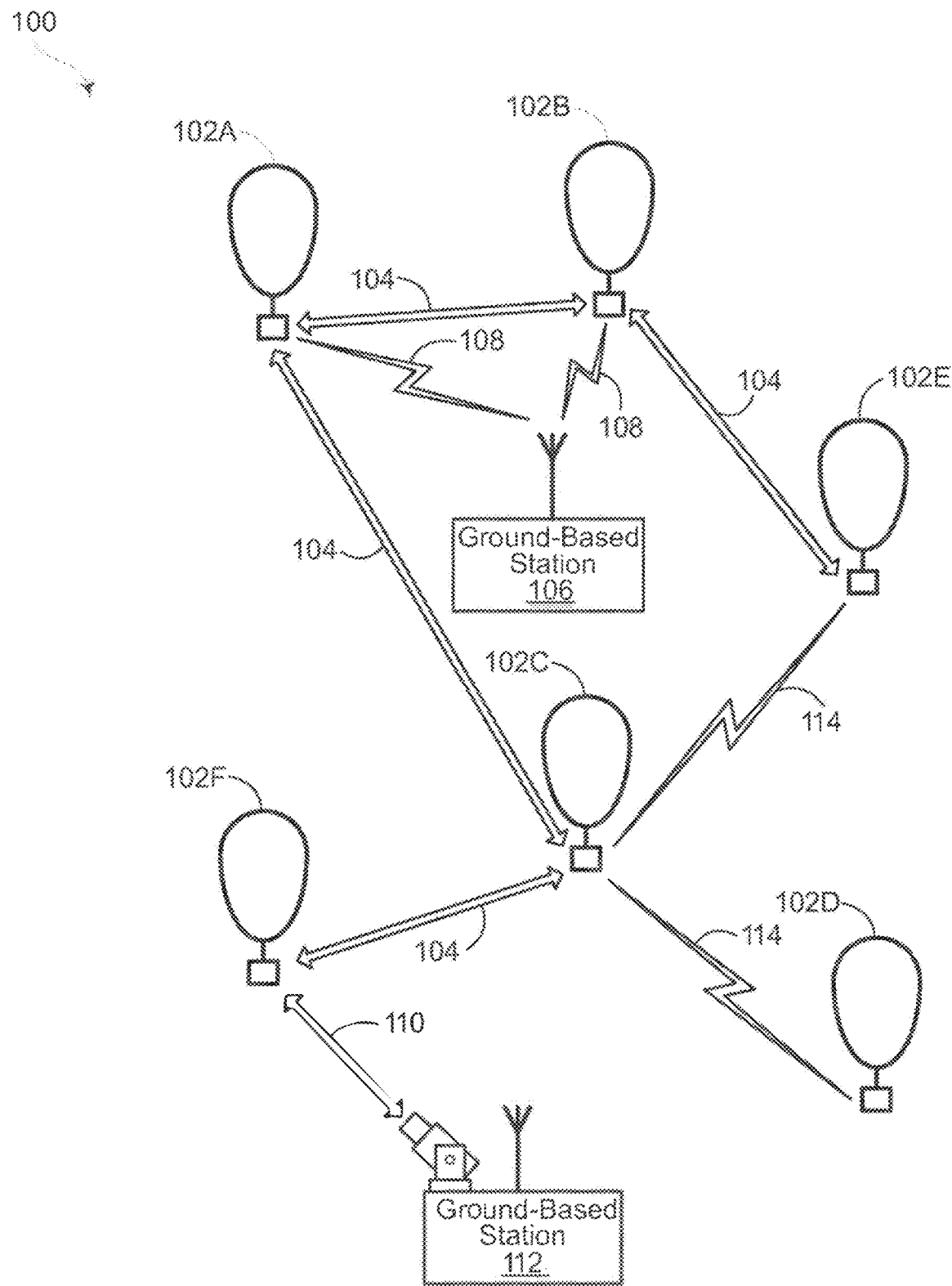
FIG. 1 is a functional diagram of a system in accordance with aspects of the present disclosure.

The current processes for assembling gored balloons for high altitude applications are extremely labor intensive. Working with film and assembling it into such a large, complex shape is extremely difficult because the film's lack of rigidity makes controlling dimensions of the balloon gore, as well as providing fixtures on the balloon gore, difficult to accomplish. As a consequence, the manufacture of balloons on a mass scale is significantly limited by the time it takes to manually assemble a balloon, as well as the human error that occurs during manual assembly. While some balloon assembly processes incorporate semi-automated machines to perform sealing operations, most processes require a human operator to at least fold the film, position it, command the machines, and apply sub components. Furthermore, it is difficult to prepare each gore with consistency.

To address the shortcomings of current balloon assembly processes, a balloon gore sealing assembly is provided that can automatically assemble a balloon, including controlling roll out of the film, film handling and fixturing, film folding, tendon application, and gore sealing without the need for a human operator to perform or assist with any of these steps. This sealing assembly can further allow for improved process repeatability/consistency and increased dimensional accuracy.

The balloon gore sealing assembly may include a table component. The table component for the assembly can be an elongated table with a length that is significantly greater than its width. The length of the table can be greater than the length of a gore. The table component can include a first platform, a second platform, and a third platform. The table component can be used to shape and heat-seal together individual gores of the balloon envelope made from sheets of balloon material. The sheets of balloon material may be provided on an elongated roll that is adjacent the elongated table and extends along a substantial length of the table, as opposed to the width of the table as in prior table components.

The first platform of the table component may provide a first working area of the table component. The first platform can provide an area for a sheet of material to be withdrawn and for assembly of a tendon to the sheet of material. In one instance, the first platform includes a primary receiving area, as well as a movable extension that provides a tendon securing area. A first edge of the movable extension may be positioned directly adjacent the primary receiving area and an opposed edge of the movable extension can be a free end that overlies the third platform. In this example, the top surface of the primary receiving area and the top surface of the movable extension can form a continuously planar surface. The first platform may have a width that is large enough to support a sheet of material that will form one half panel of a gore of the balloon envelope, as well as a portion of the second half panel. A recess may also be provided within the main body of the primary receiving area of the first platform.

The movable extension of the first platform may be collapsible. This can allow the movable extension to move from a first position, wherein the top surface of the movable extension and the top surface of the primary receiving area are coplanar, to a second position, in which they are not.

Movement of the movable extension can also change the size of the opening between the first and second platforms.

In one example, the movable extension may be rotatably attached to the main body of the primary receiving area. A hinge plate, for example, may be attached to the bottom surface of the movable extension and a top interior surface of the recess of the main body. In the stationary position, the hinge plate may be fully expanded and locked in position so that the top surfaces of the movable extension and primary receiving area form a continuously planar surface. When it is desired to move the platform, the moving platform may rotate about the hinge of the hinge plate in a downward direction toward the third platform. To place the movable extension back into the stationary position, the movable extension can be rotated in the opposite direction so that the first edge of the movable extension is adjacent the main body.

In another example, the movable extension may be configured so that the platform can be moved into the recess positioned below the top surface of the main body of the primary receiving area. In one instance, a mechanical arm may extend from within the recess to the bottom surface of the platform. The mechanical arm may be configured to move the movable extension in multiple directions, such as up, down, right, and left. To position the movable extension within the recess, the mechanical arm can move the movable extension in a vertical downward direction until the movable extension is adjacent the recess, and then in a lateral direction that positions the movable extension within the recess. The arm can then reposition the movable extension so that it is coplanar with the primary receiving area.

The second platform of the table component may be curved or include a curved portion. This curve or curved portion may provide a second working area of the table component where sheets of material are heat sealed together. The second platform of the table component may be attached to the main portion of the table component by legs extending from the second platform. The second platform may further include a smooth top layer of compliant material. The second platform may further include heat resistant material where the heat seal occurs, such as a curve strip. Finally, the edge of the second platform may include a curved surface that slopes toward the third platform.

The second platform of the table component may overlie at least a portion of the third surface. In one example, the top surface of the second platform extends in a horizontal plane that is co-planar with the top surface of the first platform. In other examples, the top surface of the first and second platforms may be spaced apart from one another. Additionally, the second platform may be laterally spaced apart from the first platform to create an opening that extends between the edge of the first platform and the edge of the second platform. The top surface of the third platform can be exposed through the opening.

The second platform of the table component may be movable. For instance, the second platform may be configured to move in a lateral direction away from the first platform. For example, each of the posts supporting the second platform may include a post that can be moved along a track within an interior portion of the second platform. The second platform can move relative to the track, as well as the first platform and the third platform. In another example, the second platform can be configured to rotate about the post so that the second platform can move in a downward direction toward the third platform. Movement of the second platform can also increase the size of the opening between the respective edges of the second platform and the first platform.

Airflow units may be positioned within the first platform and the second platform to temporarily hold the starter sheet of material in place during assembly, such as while the tendon is attached to the starter sheet.

The third platform of the table component may be configured for stacking up assembled gores of the balloon envelope. The third platform may include a trough-like collection area for holding the gores during manufacture. A top surface of the third platform may be recessed below the top surface of the first platform and the second platform so that the assembled envelop gores including the tendon attached to each gore portion can hold the gores during manufacture.

An overhead heat sealer may be used in order to heat seal sheets of material together. The overhead heat sealer can be positioned to overlie the second platform and heat seal the sheets of material along the length of the second platform.

To assemble a balloon envelope, a first gore is prepared to allow for formation of the balloon assembly. A starter sheet of material may be fed onto the table component that will form a first gore. The starter sheet of material may be automatically rolled out onto first platform of the table component, across the opening and onto the second platform. A first end of the starter sheet of material may be cut away from the roll and overlie the first platform. An opposed second end of the starter sheet may overlie the second platform. A tendon may be attached to the first sheet of material overlying the platform of the first platform.

When the tendon is secured to the starter sheet of material, airflow from the airflow unit of the second platform can be temporarily discontinued and the second platform moved laterally away from the first platform so that the second end of the starter sheet of material is transferred to the third platform. The portion of the starter sheet of material overlying the first platform can be held in place by the vacuum created by the airflow from the airflow unit of the first platform, which can be maintained during this part of the process. A clamp may be provided on the first end of the material, which can allow the first end of the sheet of material to be gripped.

The airflow from the airflow unit within the primary receiving area of the first platform may be temporarily deactivated, while the airflow unit on the platform remains activated. This can allow for the clamp attached to the starter sheet to be lifted over the tendon and onto the second platform which, in turn, causes the starter sheet of material to be folded over the tendon. Once the clamp is positioned on the second platform, the clamp can be removed and airflow from the airflow unit of the second platform can resume so as securing the first end of the starter sheet of material to the second platform.

Airflow from the airflow unit of the platform of the first platform may then be discontinued and the platform can be moved, as discussed above, so that it no longer supports the tendon. The tendon with attached starter sheet of material can falls to the third platform, while the first end of the starter sheet of material remains secured to the second platform. The starter sheet of material overlying the third platform and the starter sheet of material extending from the tendon to the second platform forms the first gore.

This process can be repeated again to form a second gore, but with an additional heat sealing step to join the first and second gores together. For instance, a second gore can be formed by feeding a second sheet of material across the first platform, the second platform, and the opening extending between the first and second platforms. In this part of the process, the second end of the second sheet of material will overlie the first end of the starter sheet material that overlies the second platform.

The airflow from the airflow unit as well as a clamp positioned on top of the second end of the first sheet of material can temporarily secure the second sheet of material to the starter sheet of material. Once the second tendon is attached to the second sheet of material overlying the platform, as previously described, the second sheet of material and the starter sheet of material can be heat sealed together. A curved sealing head may extend along the length of the second platform to seal the second and starter sheets of material together. The excess material may be simultaneously cut while the sealing head moves along the length of the table or cut thereafter. The remaining process steps can then be repeated again until the tendon is moved to the third platform and the first end of the second starter sheet of material overlies the second platform. The second gore is then in a position to be heat sealed to a third gore. The process can be continually repeated until the desired number of gores is completed.

Example System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the balloon network 100 includes a plurality of devices, such as balloons 102A-F, ground base stations 106,112 and links 104, 108, 110 and 114 that are used to facilitate intra-balloon communications as well as communications between the base stations and the balloons 102A-F. One example of a balloon is discussed in greater detail below with reference to FIG. 2.

Example Balloon

Figure 2:
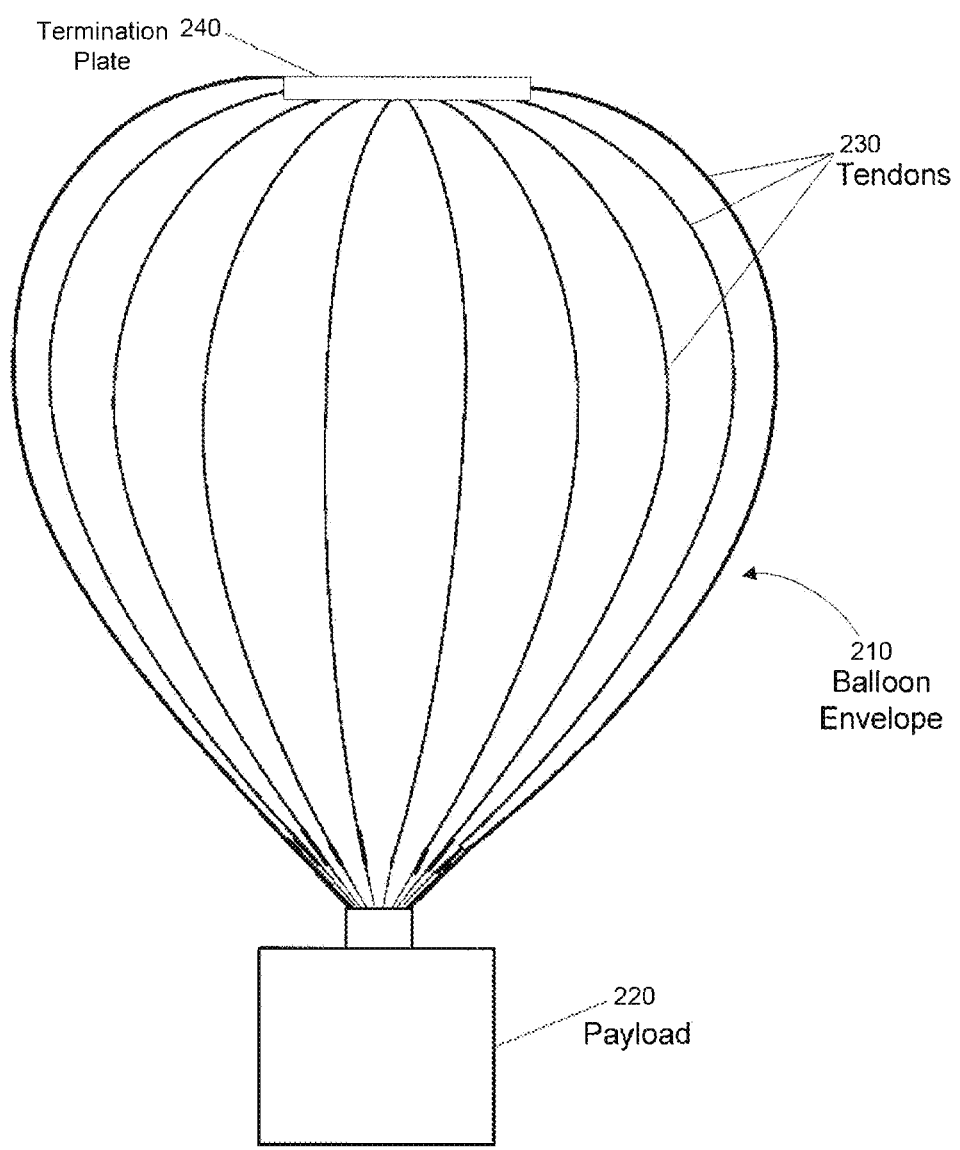
FIG. 2 is an example of a balloon in accordance with aspects of the present disclosure.

FIG. 2 is an example balloon 200, which may represent any of the balloons of balloon network 100. As shown, the balloon 200 includes a balloon envelope 210, a payload 220 and a plurality of tendons 230 attached to the balloon envelope 210 and a termination plate 240.

The balloon envelope 210 may take various forms. In one instance, the balloon envelope 210 may be constructed from materials such as polyethylene that do not hold much load while the balloon 200 is floating in the air during flight. Additionally, or alternatively, some or all of balloon envelope 210 may be constructed from a highly flexible latex material or rubber material such as chloroprene. Other materials or combinations thereof may also be employed. Further, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

Pressurized lift gas within the balloon envelope 210 may cause a force or load to be applied to the example balloon 200. In that regard, the tendons 230 provide strength to the example balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a type of sleeve or tubing may be adhered to the respective envelopes with the tendon 230 positioned therein. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of apparatus, such as termination plate 240, which may be positioned at the apex of balloon envelope 210. In some examples, bottom ends of the tendons 230 may also be connected to one another. For example, a corresponding plate (not shown) may be disposed at a base or bottom of the balloon envelope 210. In some examples, the termination plate 240 at the apex may be the same size and shape as the plate at the bottom of the envelope 210. Both plates may include corresponding components for attaching the tendons 230 thereto.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores.

Figure 3:
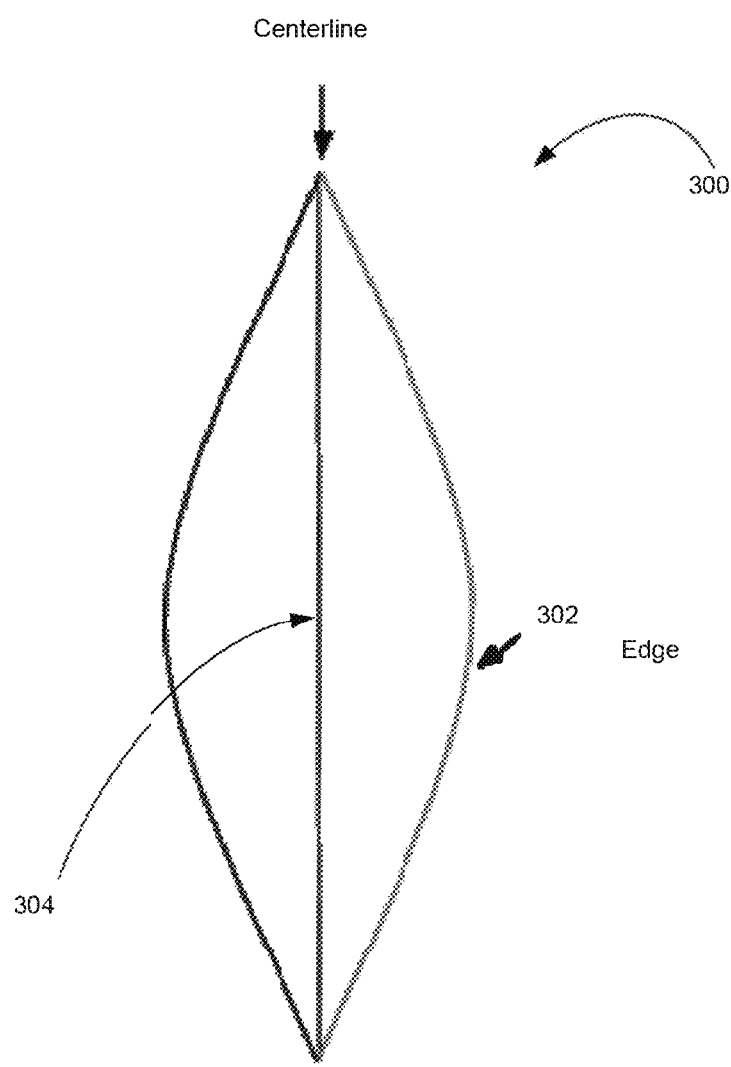
FIG. 3 is an example of an envelope gore in accordance with aspects of the present disclosure.

In FIG. 3, an example of an envelope gore 300 is shown. As shown, the envelope gore 300 may be shaped so that a length of edge seam 302 for connecting adjacent gores of the balloon envelope 210 is greater than a centerline of the envelope gore 300. When the balloon envelope 210 is inflated with lift gas, there may be an excess of envelope gore material that may bulge out somewhat before there is any strain on the envelope material. Because of this, a load may be applied to the shortest section of the envelope gore 300, e.g., the centerline portion of the envelope gore 300.

To help withstand the load caused by the lift gas within the envelope, a tendon 304 may be attached to the centerline of each gore of the envelope. As shown, the tendon 304 may be positioned lengthwise along the centerline. In some embodiments, the tendons may run through tendon tubing. The tendon tubing may be a lightweight clear plastic sleeve of a predetermined thickness, (e.g., 1 mil of polyethylene). Although the tendon 304 can move within the tendon tubing, the tubing can limit this movement so that the tendon 304 stays proximate to the centerline of the envelope gore 300.

In order to adhere the tendon 304 to the envelope gore 300, several techniques may be employed. In one example, tendon tubing comprising the tendon 304 may include a pressure sensitive adhesive (PSA) backing. In this example, a covering for the PSA backing may be removed so that the tendon tubing can be taped along the entire length of the envelope gore 300. In other examples, a heat-sealing method can be used. For example, an automated sealing unit (not shown) can be run along the tendon tubing in order to apply heat of a certain temperature to heat seal the tendon tubing to the envelope gore 300. The tendon 304 may be adhered to the envelope gore 300 during a certain manufacturing process. An example of an assembly for use during this manufacturing process is further described below.

Example Assembly

One aspect of the present technology provides an automated assembly for manufacturing envelope gores for balloons. In this example, the assembly includes particular machinery components, such as a sealing device and a compact assembly table with multiple platforms, some of which are configured to move relative to one another.

Figure 4:
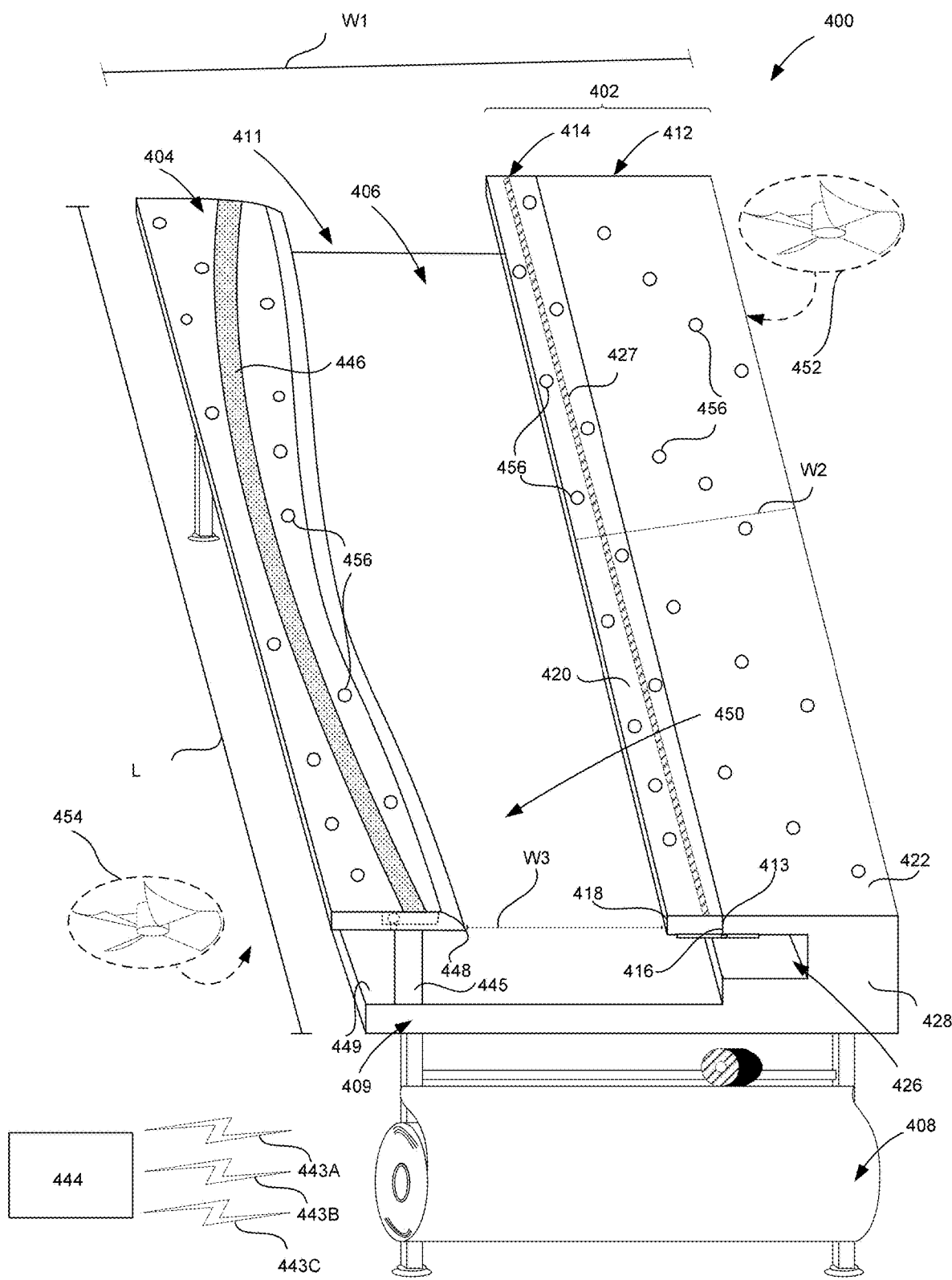
FIG. 4 is an example of a table component in accordance with aspects of the present disclosure.

In FIG. 4, one example of a table component 400 for the assembly is shown. The table component 400 for the assembly can be an elongated table with a length L extending between a first end 409 of the table and a second end 411 of the table. The length L may be significantly greater than its width W1, as well as greater than the length of a balloon envelope gore. As shown, the table component 400 may include a first platform 402, a second platform 404, and a third platform 406. The table component 400 can be used to shape and heat-seal together individual gores of the balloon envelope made from sheets of balloon material.

The first platform 402 of the table component 400 may provide a first working area of the table component 400, such as an area for a sheet of material to be withdrawn from the roll 408 of balloon material and for assembly of a tendon to the sheet of material. In one instance, the first platform 402 includes a primary receiving area 412, as well as a movable extension 414 that provides a tendon securing area. A first edge 416 of the movable extension 414 may be positioned directly adjacent an edge 413 of the primary receiving area 412, and a second edge 418 of the movable extension 414 can be a free end that overlies the third platform 406. In this example second edge 418 is opposite of first edge 416.

The top surface 420 of the movable extension 414 and the top surface 422 of the primary receiving area 412 can form a continuously planar surface. A smooth top layer of compliant material (not shown) may also be provided on the top surfaces 420,422. The first platform 402 may have a width W2 that is large enough to support a sheet of balloon material withdrawn from the roll 408 that will form one half of a gore of a balloon envelope, as well as a portion of a second half of the gore of the balloon envelope. A recess 426 may also be positioned below the top surface 422 and within the main body 428 of the primary receiving area 412 of the first platform 402.

An indicator 427 may be provided on the movable extension 414. The indicator 427 can be arranged along a lengthwise axis of the table component 400. The indicator 427 may be used to mark a position on the table component 400 for placing a tendon on an envelope gore being manufactured. Alternatively or additionally, a channel can also be provided to help guide and position a tendon during balloon assembly.

The movable extension 414 of the first platform 402 may be configured to move relative to the primary receiving area 412. This can allow the movable extension 414 to move from a first stationary position, wherein the top surface 420 of the movable extension 414 and the top surface 422 of the primary receiving area 412 are coplanar and the first edge 416 of the movable extension 414 is adjacent and contacts the edge 413 of the primary receiving area 412, to a second displaced position, in which they are not. Movement of the movable extension 414 can further change the size of the opening 450 between the first and second platforms 402,404, as discussed in more detail below.

Figure 5:
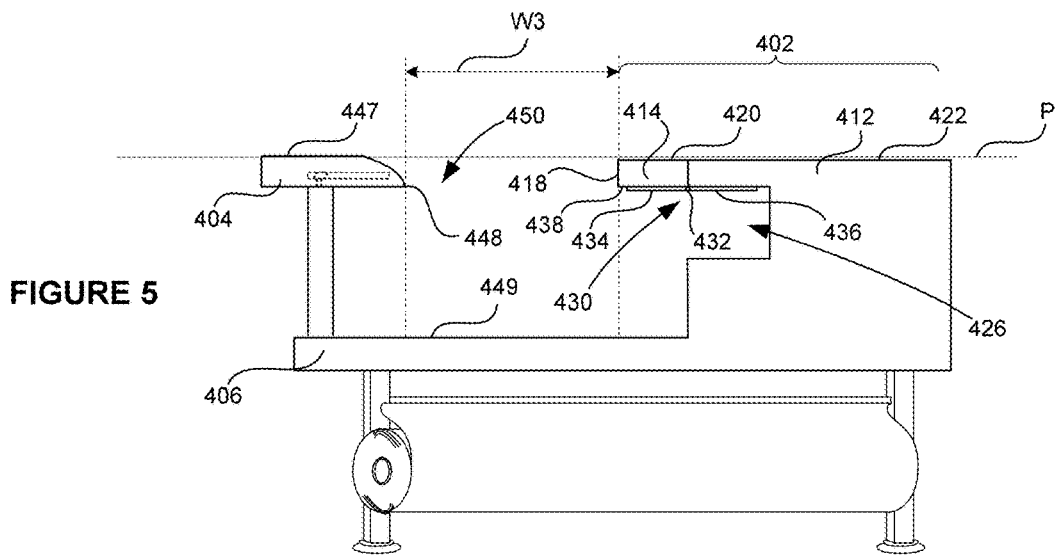
FIG. 5 is a cross-sectional view of FIG. 4.

In one example, the movable extension 414 may be rotatably attached to the main body 428 of the primary receiving area 412 of the first platform 402. A hinge plate may be used to cause movement of the movable extension 414. In one instance, as shown in FIG. 5, a hinge plate 430 may include a first plate 434 and a second plate 436 rotatably attached to one another by a hinge 432 positioned between the first and second plates 434,436. The first plate 434 may be attached to the bottom surface 438 of the movable extension 414 and the second plate 436 may be attached to the top interior surface of the recess 426 of the main body 428.

In the stationary position, as shown for example in FIG. 5, the hinge plate 430 may be fully expanded. For example, in this stationary position, the top surface 420 of the movable extension 414 and top surface 422 of the primary receiving area 412 may form a substantially continuous planar surface and the first edge 416 of the movable extension 414 may be adjacent the edge 413 of the primary receiving area 412 of the first platform 402. Additionally, the second edge 418 of the movable extension 414 will be spaced apart from the lower edge surface 448 by a distance W3, which also represents the size of the opening 450 between the first platform and the second platform. In this example, the distance W3 will vary along the length of the second edge surface 448 of the second platform 404 due to the curved shape of edge surface 448 and the linear shape of the second edge surface 418. In other examples, however, where the edge surface 448 of the second platform is planar, W3 may be a constant distance along the length L of the table component.

Figure 6A:
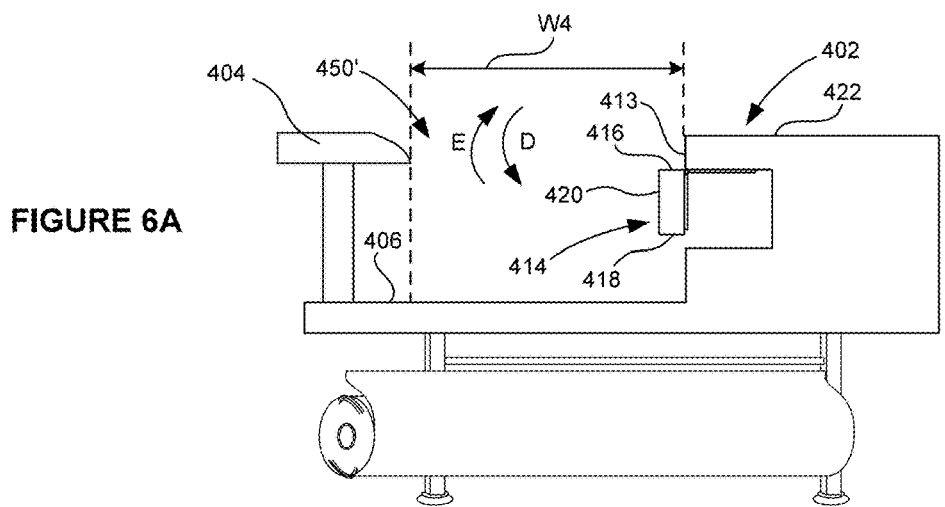
FIG. 6A is a cross-sectional view showing the movable extension of the first platform in FIG. 5 in a second position according to aspects of the disclosure.

The movable extension 414 is configured to be movable relative to the second platform 404, the third platform 406, and the primary receiving area 412 of the first platform 402. In one instance, as shown for example in FIG. 6A, the movable extension 414 can move or be displaced into the second displaced position when the movable extension 414 rotates about the hinge 432 of the hinge plate 430 in a downward direction D toward the third platform 406. Movement of the movable extension 414 away from the primary receiving area 412 exposes the edge surface 413 of the primary receiving area 412 and increases the distance and size of the opening between the first platform 402 and the second platform 404. In this instance, the opening 450' between the edge 413 of the primary receiving area 412 and the edge surface 448 of the second platform is increased from distance W3 to a distance W4. The movable extension 414 can therefore move relative to one or more of the primary receiving area 412, the second platform 404, and the third platform 406 to provide an opening 450' in the second displaced position that is greater than the size of the opening 450 in the stationary position (shown in FIG. 5). The movable extension 414 can be rotated in the opposite direction E to place the movable extension 414 back into the stationary position.

In some examples, movement of the movable extension 414 may be controlled by a control unit 444, such as shown in FIG. 4 that is configured to move the movable extension 414 between the first stationary position and second displaced position. The control unit 444 can communicate with the movable extension using a communication link 443A, which can be a wired or wireless link. For example, the control unit 444 may provide commands so that the movable extension 414 rotates about the hinge 432. To communicate with the movable extension 414 using the communication link 443A, the movable extension may include communication circuitry (not shown). This communication circuitry may include a receiver/transmitter for processing signals to and from the control unit 444. In some examples, these signals may include commands for the movable extension 414, e.g., to allow for movement of the movable extension 414 from the first stationary position to the second displaced position.

The second platform 404 of the table component 400 may provide a second working area of the table component 400, where sheets of balloon material are heat sealed together. The second platform 404 of the table component 400 may be curved and attached to the third platform 406 of the table component 400 by various means, such as a plurality of legs 445 (only a single leg shown due to perspective) that extend from the second platform 404 toward the third platform 406. In other examples, a continuous wall may be used to join the second platform 404 and third platform 406, or the second platform 404 may be attached to a frame that extends adjacent to the third platform 406 or overlies the table component 400. The second platform 404 may further include a smooth top layer of compliant material (not shown), as well as heat resistant material where the heat seal occurs, such as a curve strip 446, shown in FIG. 4. Finally, the edge surface 448 of the second platform 404 may be a curved surface that follows the contour of the curve strip 446. The edge surface 448 may also be sloped and extend in a direction toward the third platform 406.

With reference back to FIG. 5, the second platform 404 of the table component 400 may overlie at least a portion of the third platform 406. In one instance, the top surfaces 420,422 of the first platform 402 and the top surface 447 of the second platform 404 may extend along the same plane P. Alternatively, the top surface 447 of the second platform 404 can extend in a horizontal plane that is vertically spaced apart from the top surfaces 420,422 of the first platform 402. As previously noted, the second platform 404 may be laterally spaced apart from the first platform 402 to create an opening 450 having a distance W3 (see also FIG. 4) that extends between the second edge 418 of the movable extension 414 of the first platform 402 and the edge surface 448 of the second platform 404. The top surface 449 of the third platform 406 can be exposed through the opening 450.

Figure 6B:
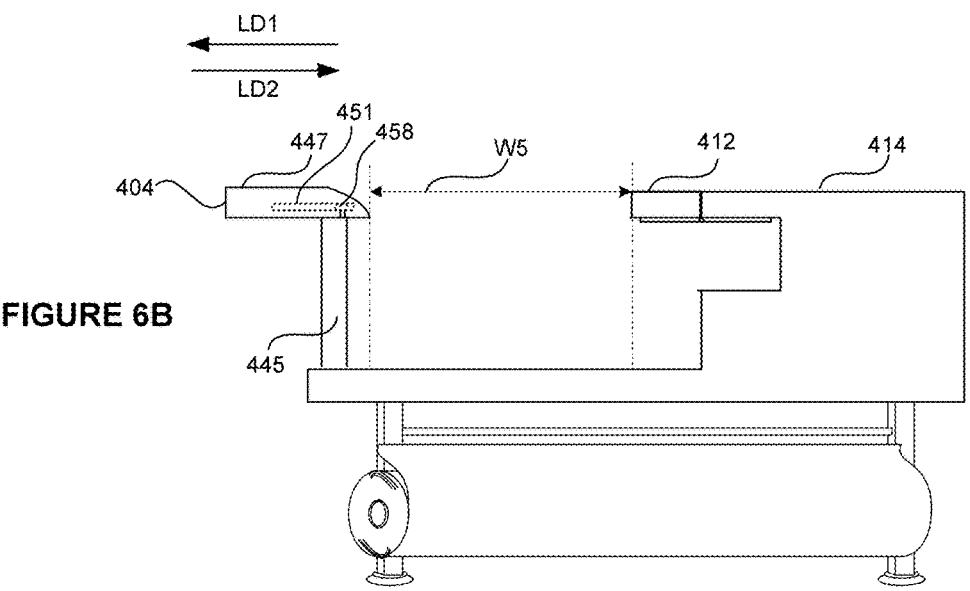
FIG. 6B is a cross-sectional view showing the second platform of FIG. 5 in a second position according to aspects of the disclosure.

The second platform 404 of the table component 400 may be movable from a first stationary position to a second displaced position. For instance, as shown in FIG. 5, wherein the first platform 402 and second platform 404 are in a stationary position, and FIG. 6B, where the second platform 404 is in the second displaced position, the second platform 404 may include an interior track 451 and a rolling post 458. As shown in FIG. 6B, the second platform 404 may be configured to move in a lateral direction LD1 away from the first platform 402, as well as in a direction LD2 toward the first platform 402. For example, each of the legs 445 supporting the second platform 404 may include a rolling post 458 that fits within the interior portion of the second platform 404, as well as the interior track 451, which is shown in dashed line due to it being positioned within the interior of the second platform 404. The rolling post 458 can allow for the second platform 404 to move along the interior track 451, as shown in FIG. 6B, where the second platform 404 has been moved to the second moved position. The second platform 404 can therefore be movable relative to the first platform 402 and the third platform 406.

Movement of the second platform 404 can also increase the size of the opening 450 between the respective edges of the second platform 404 and the first platform 402. As shown, for example, in FIG. 6B, when the second platform 404 is moved in the lateral direction LD1, the edge of the second platform 404 and the edge of the movable extension 414 of the first platform 402 are spaced apart from one another by a distance W5 that is greater than the distance W3 (FIG. 5).

The control unit 444 may also be used to control movement of the second platform 404, as shown in FIG. 4. The control unit 444 can be configured to move the second platform 404 between a first stationary position and the second displaced position. The control unit 444 can communicate with the second platform 404 using another communication link 443B, which can be a wired or wireless link. The second platform 404 may further include communication circuitry (not shown), such as a receiver/transmitter for processing signals to and from the control unit 444. In some examples, the signals generated by the control unit 444 may include commands for the second platform 404, e.g., to allow for movement of the second platform 404 from the first stationary position to the second displaced position. Alternatively, the second platform 404 may be controlled by a separate control unit.

One or more airflow units may be provided within the first platform 402 and the second platform 404 to temporarily hold one or more sheets of balloon material in place during assembly. In one instance, as shown, for example in FIG. 4, a first air flow unit 452 may be positioned within the first platform 402 and a second air flow unit 454 may be provided in the second platform 404. The first air flow unit 452 may be configured with vents that can direct airflow to the primary receiving area 412 and movable extension 414 of the first platform 402. The second air flow unit 454 may be configured with vents that can direct airflow to the second platform 404. Openings 456 in the first and second platforms 402,404 allow for air to flow from the air flow units 452,454 through the vents and into the openings 456 so as to create a vacuum that can secure the sheets of balloon material to the first and second platforms 402,404. Dampers (not shown) can be provided that can either prevent or allow air flow from the first and second air flow units 452,454 into one or more of the primary receiving area 412 and the movable extension 414 of the first platform 402, as well as the second platform 404.

The third platform 406 of the table component 400 may be configured for stacking up assembled gores of the balloon envelope 210. The third platform 406 may include a trough-like collection area for holding the gores during manufacture. A top surface 449 of the third platform 406 may be recessed below the top surfaces 420,422 of the first platform 402 and the top surface 447 of the second platform 404 so that the assembled envelope gores including the tendon attached to each gore portion can hold the gores during manufacture.

Figure 7:
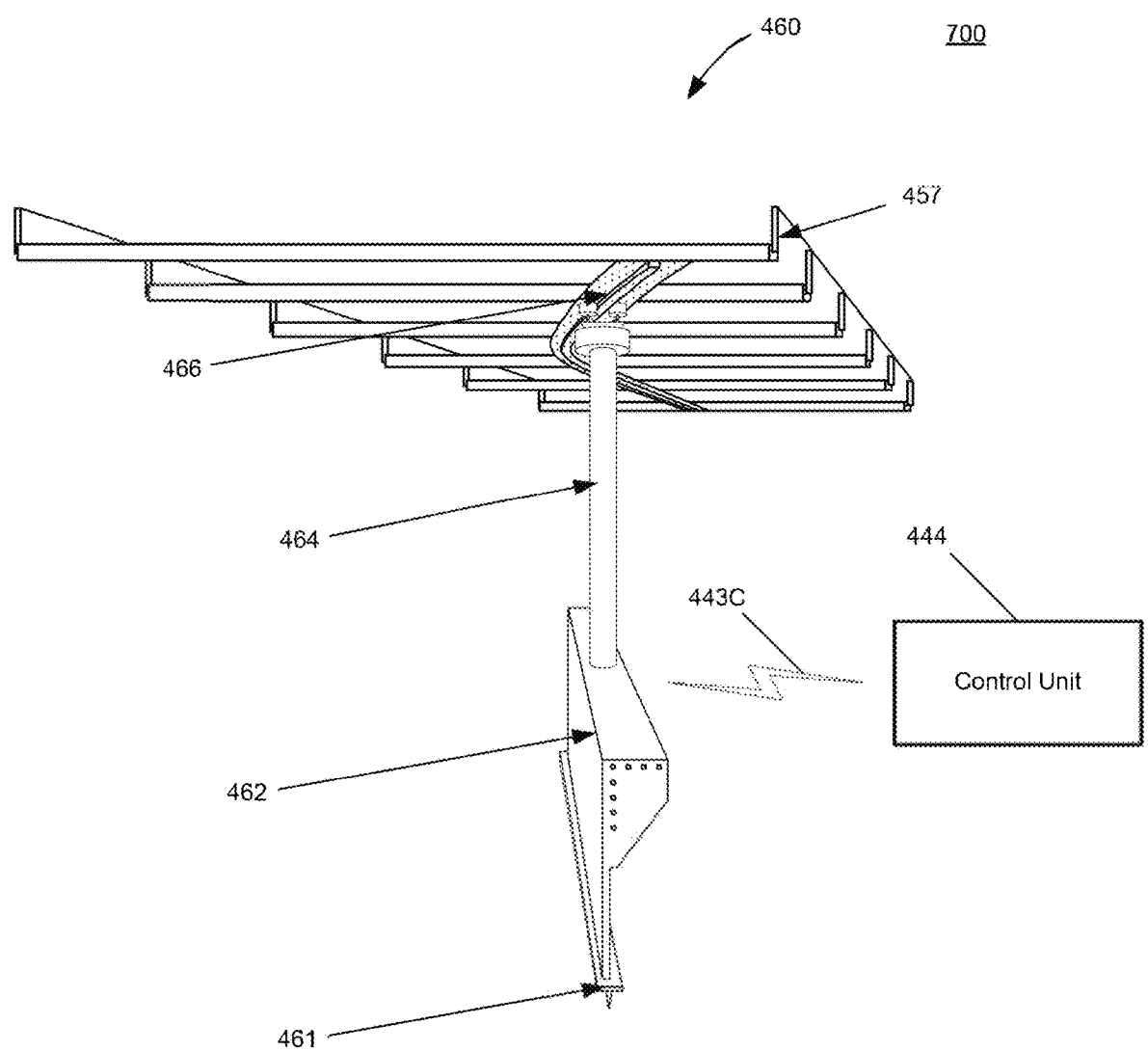
FIG. 7 is an example of a sealing component in accordance with aspects of the present disclosure.

An overhead heat sealer may be used in order to heat seal sheets of material together. The overhead heat sealer can be positioned to overlie the second platform 404 and heat seal the sheets of material along the length of the second platform 404. By way of example only, FIG. 7 is an example 700 of a sealing component 460 for the assembly. In this example, the sealing component 460 includes a sealing device 462 coupled to the track 466 via an actuating arm 464.

In some examples, the control unit 444 may further control operations of the sealing component 460 using a communication link 443C, which can be a wired or wireless link. (See also FIG. 4.) Communication circuitry (not shown), such as a receiver/transmitter for processing signals to and from the control unit 444, can allow for communication between the sealing component 460 and the control unit 444 through the communication link 443C. These signals may include, for example, commands for the sealing component 460, e.g., to activate the actuating arm 464 and/or to activate heat-sealing operations of the sealing device 462.

Sealing device 462 may include an electrically heatable element 461 disposed on the device. The heatable element 461 may be of a predetermined width and length that may be used to unite layers of the balloon material. For example, the heatable element 461, when activated, for example by a flow of electricity, may reach a certain temperature that is hot enough to heat bond or otherwise melting a section of two or more sheets of balloon material together. In this regard, the sealing device 462 may be used to press the sheets together in order for the heat bond to activate. In some embodiments, heatable element 461 may have a generally planar surface so that the heat bond may be applied consistently across the section of balloon material currently being bonded. Although a heat activated adhesive or other types of similar adhesives may be used for heat sealing the balloon material, an advantage of melting the sheets together is that it results in a faster and easier process with minimal parts, and may produce a better Coefficient of Thermal Expansion (CTE) match across the bonded material.

In some embodiments, sealing device 462 may provide a combination of operations for heat sealing and cutting of the balloon material 408. For example, the sealing device 462 may be configured to cut the balloon material 408 by using heat and an amount of pressure at the same time as the seal is made. Alternatively, the sealing device 462 may include blade like cutting members (not shown) attached to the heatable element 461. In some embodiments, the cutting members may be attached directly to the sealing device 462 or may be separated from the sealing device 462 and used after the heat bonding is completed. A benefit of configuring the sealing device 462 for cutting is that the balloon material may be immediately cut after being heat bonded. For example, as the sealing device 462 is pressed upon the balloon material, the device may be configured to automatically moved, thereby causing the cutting members to cut away portions of extra material.

In order to move the sealing device 462, track 466 may be used. The track 466 can be mounted on any suitable support. As shown in FIG. 4, track 466 is mounted on an overhead support 457. In some embodiments, the track 466 may be configured so that the sealing device 462 can be guided along a horizontal axis with respect to the overhead support 457. This horizontal axis may correspond to a lengthwise direction of a sheet of balloon material rolled out onto table component 400. The track 466 can be configured so that sealing device 462 can move forward and back horizontally by using actuating arm 464. This forward and back movement of the sealing device 462 along track 466 can be automatically operated, for example, by using commands from the control unit 444.

The sealing device 462 can be mounted to actuating arm 464. As noted above, the arm 464 may allow the sealing device 462 some freedom of movement horizontally along track 466. In some embodiments, the actuating arm 464 can also be activated to cause the sealing device 462 to move vertically. For example, the actuating arm 464 may include housing (not shown) that can extend and retract the arm between first and second positions. In some aspects, extension of the actuating arm 464 allows the sealing device 462 to be pressed against the balloon material in order to cause the heat bond activation. As with the movement along track 466, the actuating arm 464 can extend and/or retract manually, automatically or some combination thereof, for example, by using commands from communication unit 470.

Figure 8A:
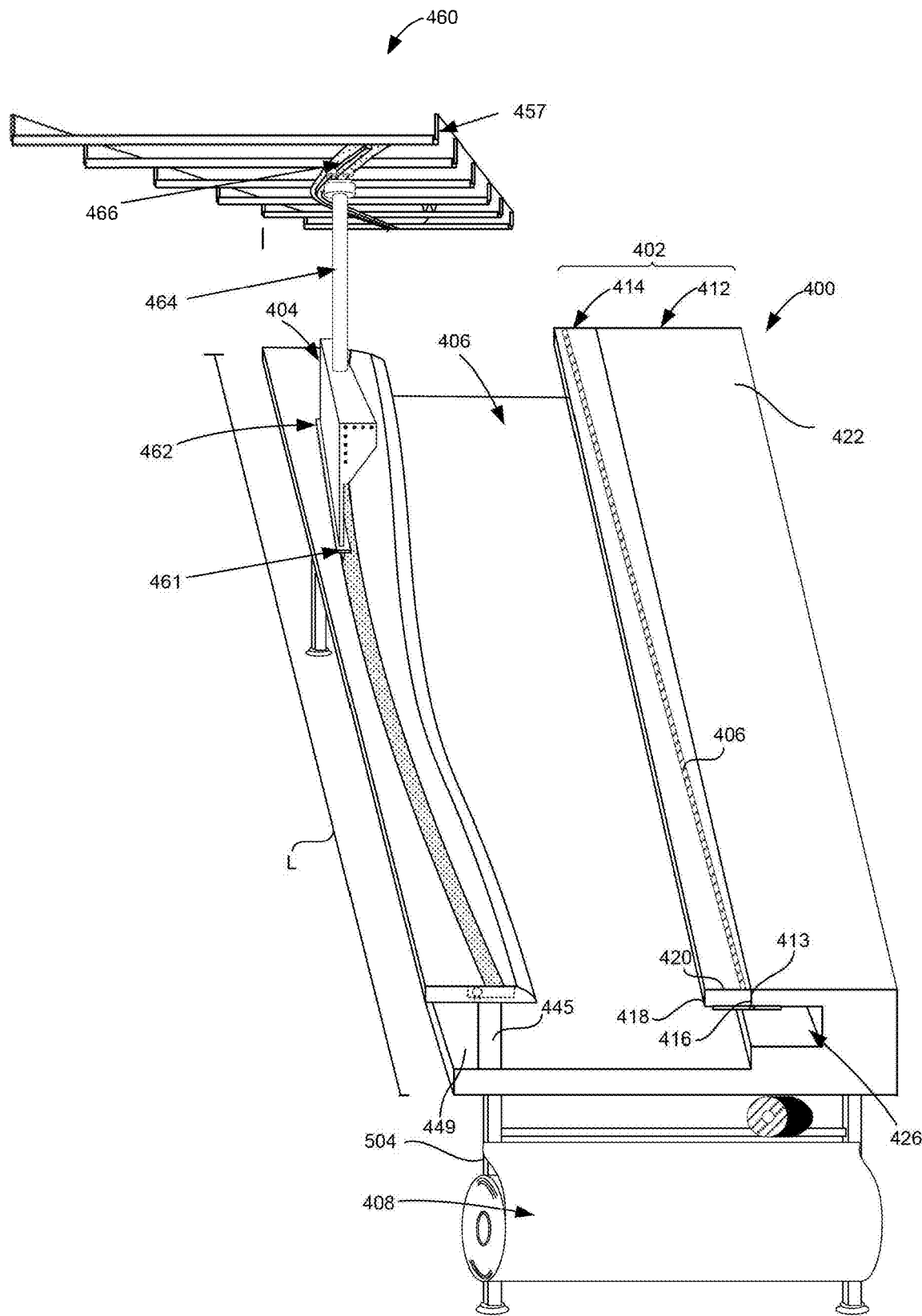
FIG. 8A is an example of a system in accordance with aspects of the present disclosure.
Figure 8B:
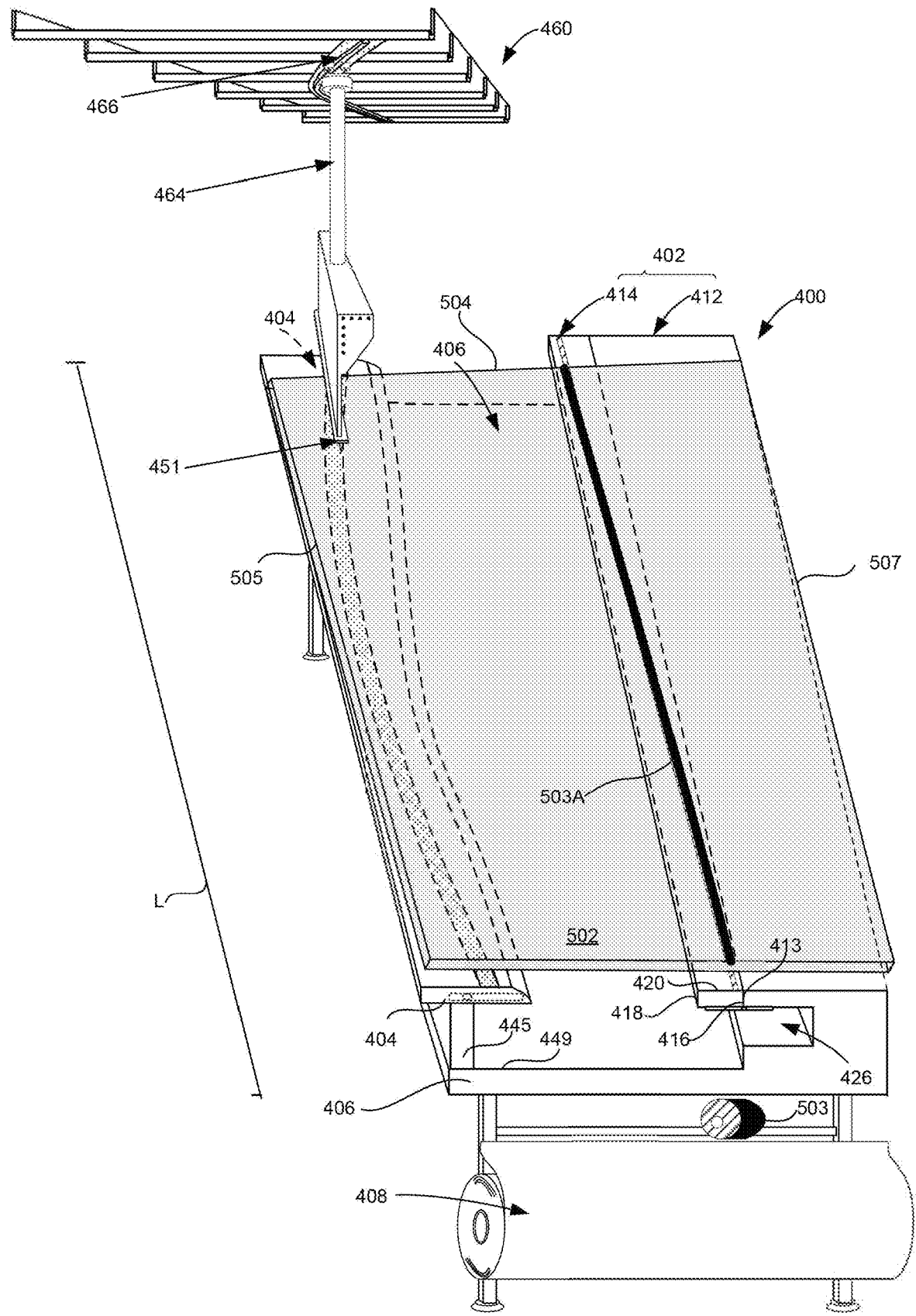
FIG. 8B is an example system showing a balloon envelope material disposed on the top surface of the example table component.

FIG. 8A is an example of an assembly 500, which may include machinery components such as the table component 400 and sealing component 460 as described above. The assembly 500 may be used to manufacture envelope gores for balloons. To assemble a balloon envelope, a first gore is prepared to allow for formation of the balloon assembly. A starter sheet of material 502 may be automatically fed onto the table component 400 from roll 408, as shown in FIG. 8B, which will be used to form a first gore. The starter sheet of material 502 may be rolled out onto the first platform 402 and the second platform 404 of the table component 400, as well as across the opening 450. In one instance, a moveable gantry (not shown) can be attached to the end 504 of the starter sheet of material 502 and can run the length of the table. As the movable gantry moves along the length L of the table component 400, the starter sheet of material 502 is unrolled and the starter sheet of material 502 is positioned along the length L of the table component. A first clamp (not shown) may be provided along or adjacent one or more portions of the first longitudinal edge 505 to help secure the starter sheet of material 502 to the second platform 404. The starter sheet of material may be cut away from the roll 408 to form a first edge 508 of the starter sheet of material 502. The starter sheet of material 502 may also be cut along the first longitudinal edge 505 in the shape of the gore envelope.

A tendon 503A may be attached to the starter sheet of material 502. In one example, tendon 503A may be pulled out from the roll 503 by the gantry at the same time the starter sheet of material 502 is pulled out from the roll of sheet material. The tendon 503A may be attached to the first sheet of material 502 overlying the first platform 402, using the indicator 427 or any other mechanisms to help guide and secure the tendon to the first sheet of material, as previously discussed herein. When the tendon 503A is secured to the length of the starter sheet of material 502, the second platform 404 can be moved in a lateral direction away from the first platform 402 so that the first longitudinal end 505 of the starter sheet of material 502 is transferred to the third platform 406. Thereafter, a second clamp (not shown) may be provided along the second longitudinal edge 507 of the starter sheet of material 502, which can allow the second longitudinal edge 507 of the sheet of material 502 to be gripped. The second clamp may be attached to an overhead frame that is configured to move the clamp from the first platform 402 to the second platform 404. The second clamp and the second end 507 of the starter sheet of material 502 can be lifted over the tendon and onto the second platform 404. This movement causes the second end 507 of the starter sheet of material 502 to be folded over the tendon. Once the second clamp and the second longitudinal edge 507 of the starter sheet of material 502 are positioned on the second platform 404, the second clamp can be removed.

The movable extension 414 can be moved, as discussed above, so that it no longer supports the tendon 503A. Without the support of the movable extension 414, the tendon 503A with attached starter sheet of material 502 can be displaced toward the third platform 406, while the second longitudinal edge 507 of the starter sheet of material 502 remains secured to the second platform 404. The starter sheet of material 502 overlying the third platform 406 and the starter sheet of material 502 extending from the tendon to the second platform 404 forms the first gore.

This process can be repeated again to form a second gore, but with an additional heat sealing step to join the first and second gores together. For instance, a second gore can be formed by feeding a second sheet of material 526 across the first platform 402, the second platform 404, and the opening 450 extending between the first and second platforms 402, 404. In this part of the process, the first longitudinal edge 505 of the second sheet of material will overlie the first longitudinal edge 505 of the starter sheet material 502 that overlies the second platform 404.

Once a second tendon of the second gore is attached to the second sheet of material overlying the movable extension 414, as previously described, the second sheet of material and the starter sheet of material 502 can be heat sealed together. A sealing head may move along the length of the second platform 404 to seal the second and starter sheets of material 502,510 together. Excess material may be simultaneously cut while the second tendon 538 moves along the length L of the table component 400 or cut thereafter. The remaining process steps can then be repeated again until the tendon is moved to the third platform 406 and the first end of the second starter sheet of material 502 overlies the second platform 404. The second gore is then in a position to be heat sealed to a third gore. The process can be continually repeated until the desired number of gores is completed.

Figure 9A:
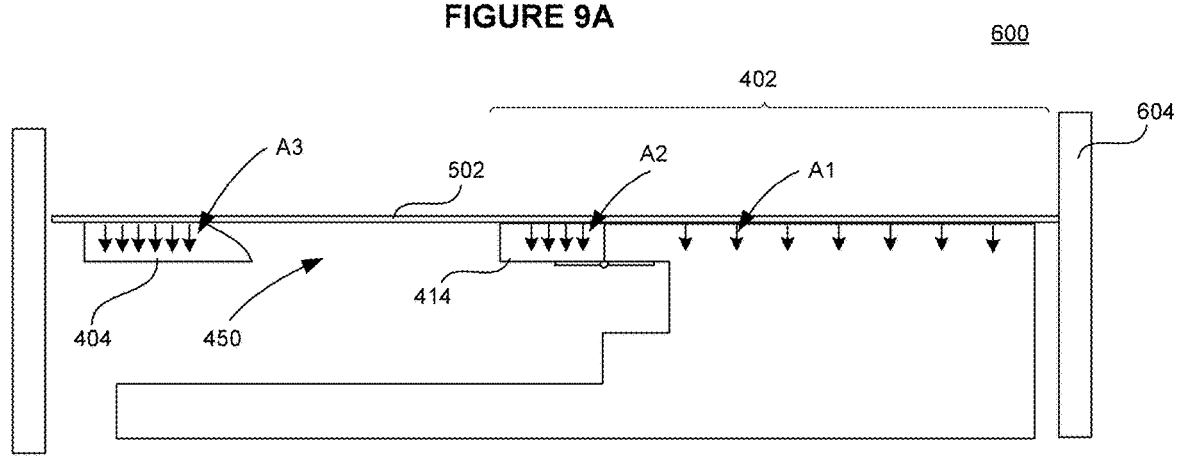
FIGS. 9A-9P is an example of a process for assembling envelope gores in accordance with aspects of the present disclosure.
Figure 9B:
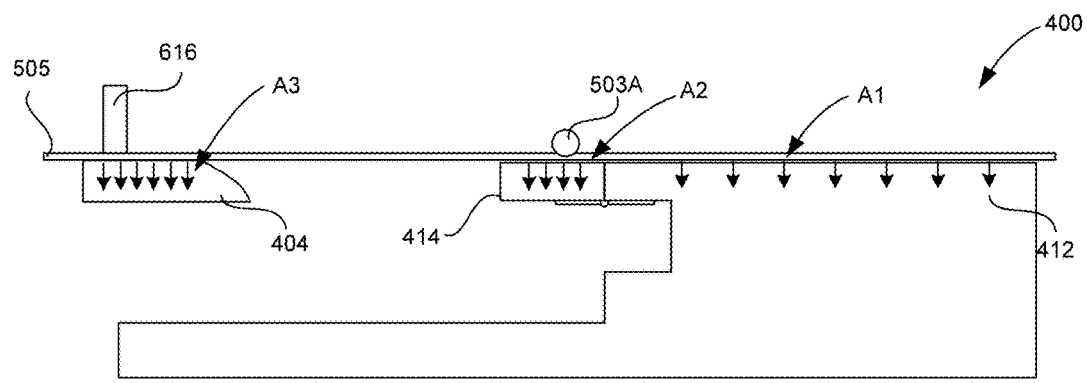
Figure 9C:
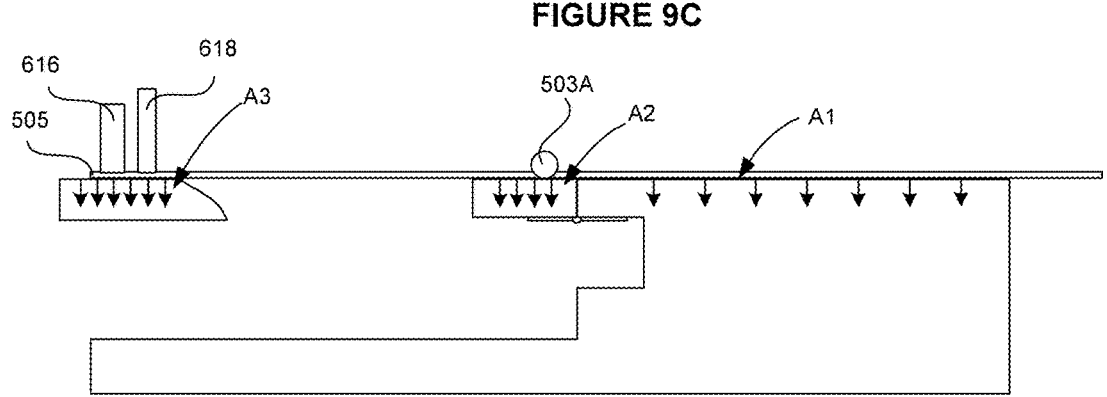
Figure 9D:
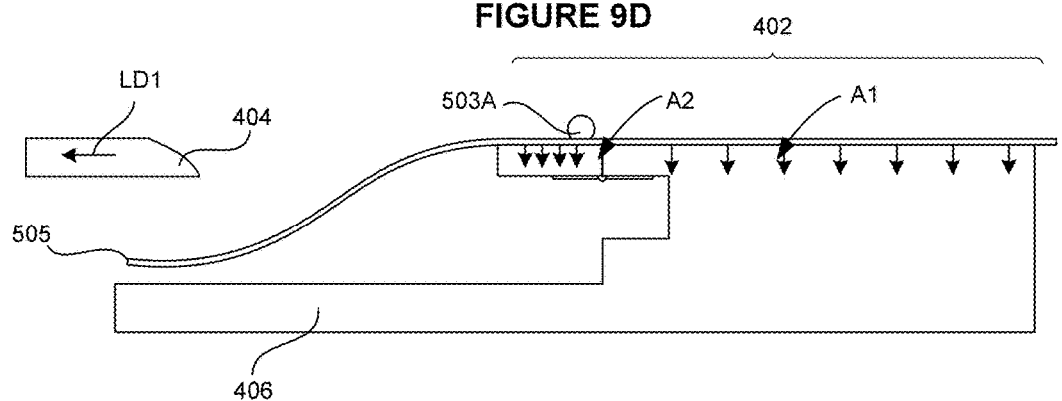
Figure 9E:
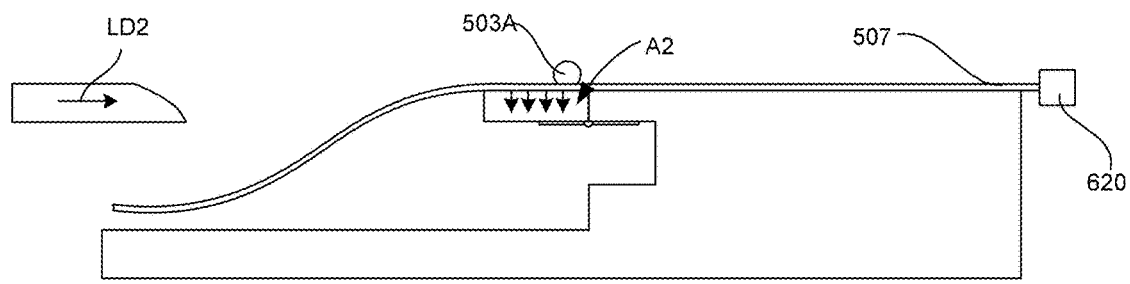
Figure 9F:
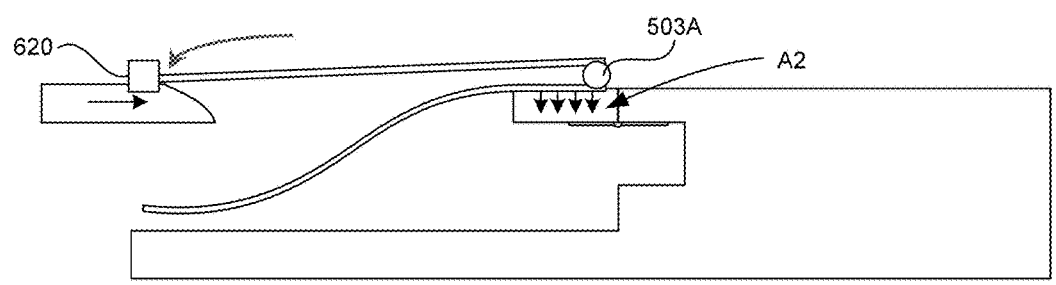
Figure 9G:
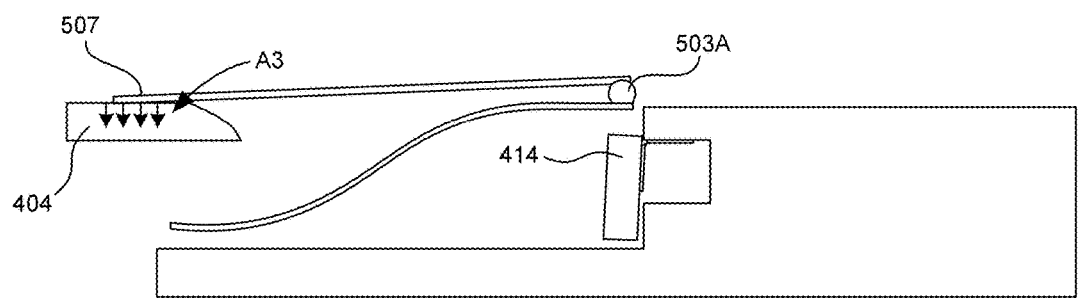
Figure 9H:
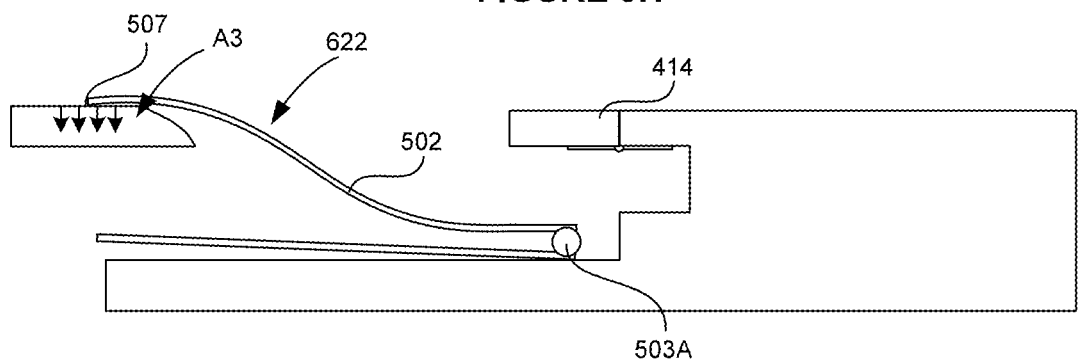
Figure 9I:
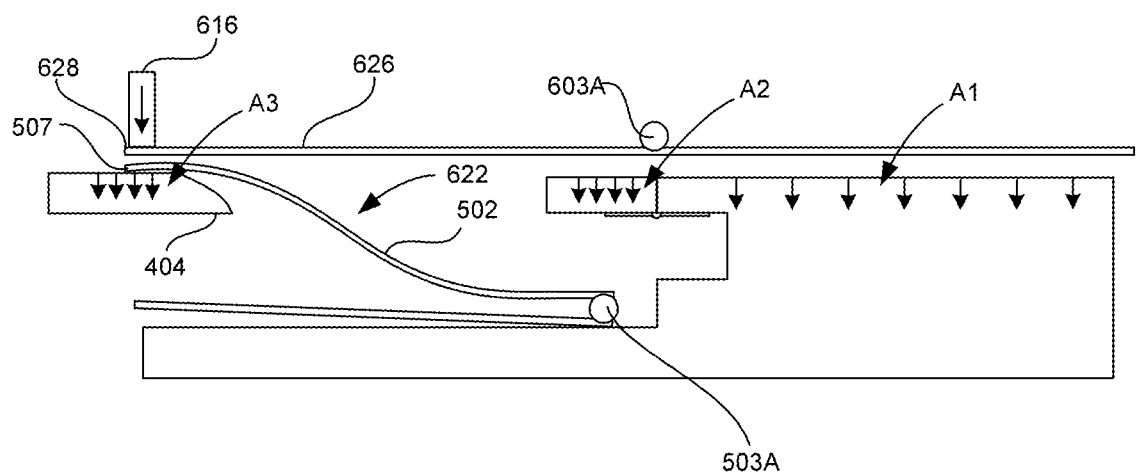
Figure 9J:
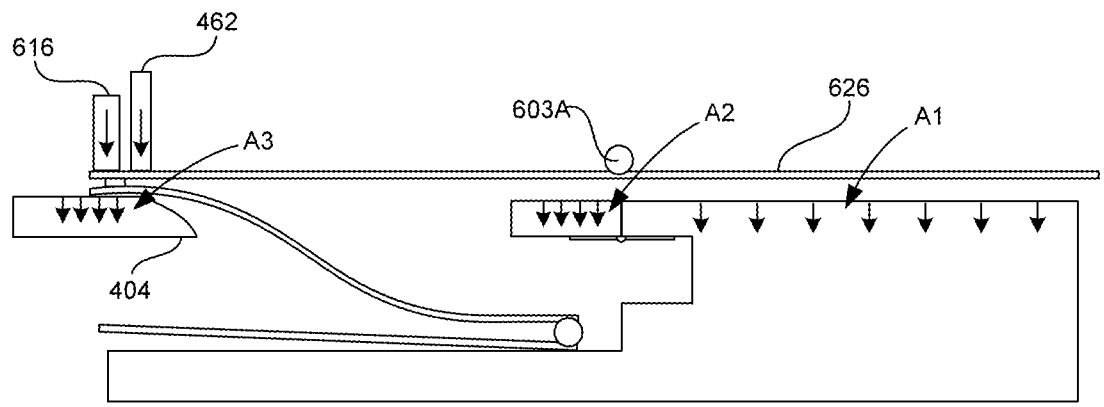
Figure 9K:
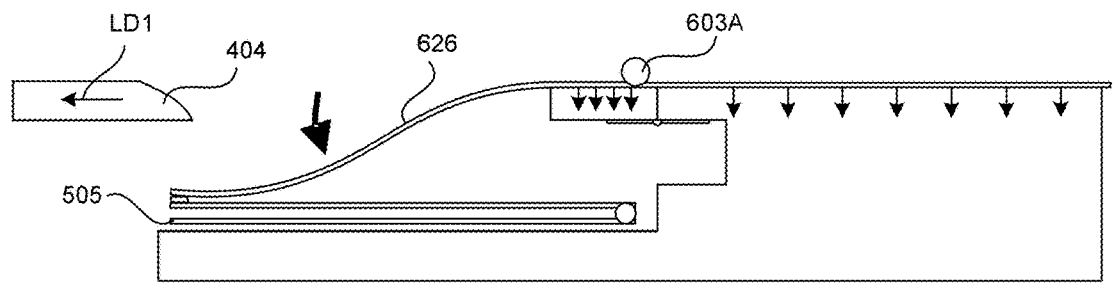
Figure 9L:
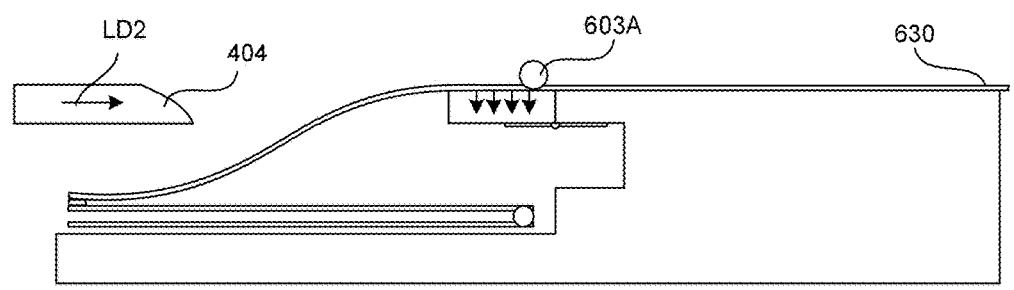
Figure 9M:
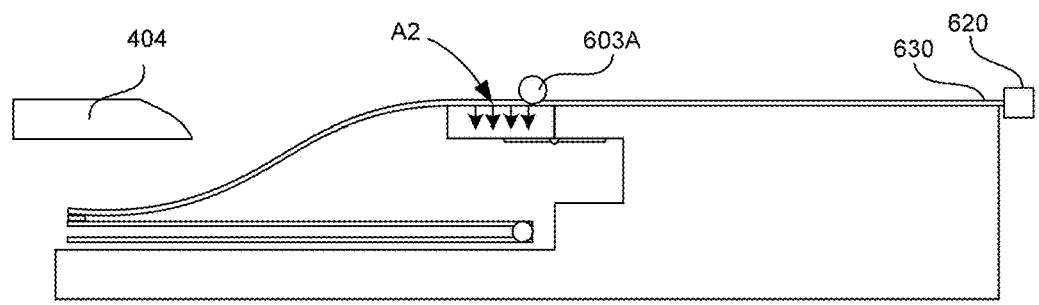
Figure 9N:
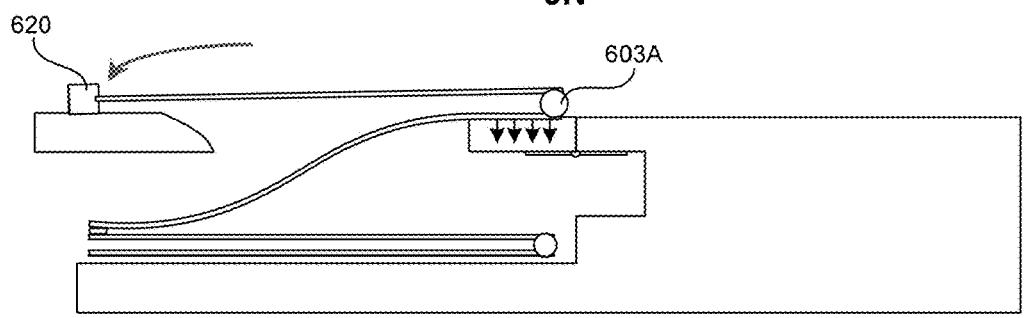
Figure 9O:
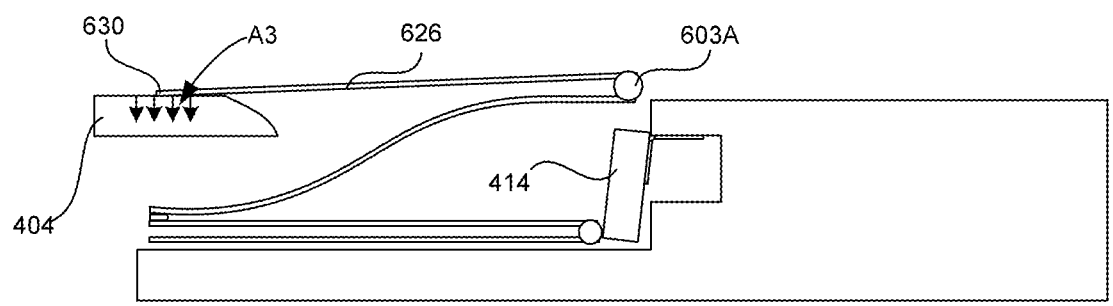
Figure 9P:
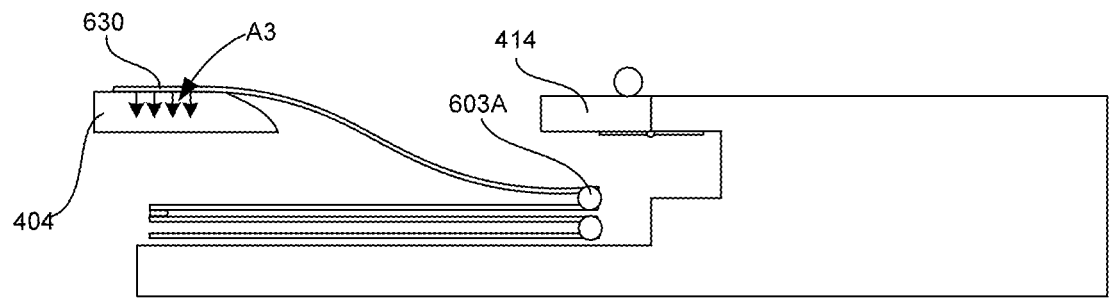

FIGS. 9A-9P provide an example of a process 600 for assembling at least two envelope gores together, for example, by using assembly 500 as described above, including use of the airflow units to further assist with the assembly process. To assemble a balloon envelope, a first gore is prepared to allow for formation of the balloon assembly. With reference to FIG. 9A, the starter sheet of material 502 may be fed onto the table component 400 that will form a first gore. The starter sheet of material 502 may be automatically rolled out onto first platform 402 and the second platform 404 of the table component, as well as across the opening 450. In one instance, a moveable gantry can be attached to a first end 504 (See FIG. 8B) of the starter sheet of material 502. The movable gantry can move along the longitudinal axis of the table from the first end 409 of the table component 400, positioned adjacent the roll 408, to the opposite second end 411 (see FIG. 4) of the table component 400. As the movable gantry moves along the length L of the table component 400, the starter sheet of material 502 is unrolled and the starter sheet of material 502 is pulled or moved along the length of the table component 400. Air flow from the first and second air flow units 452,454 may be provided through the openings 456 in each of the first and second platforms 402,404 to help secure the starter sheet of material 502 to the top surfaces of the first and second platforms 402,404. In one instance, a first airflow A1 may be provided through the primary receiving area 412 of the first platform 402, a second airflow A2 may be provided through the movable extension 414 of the first platform 402, and a third airflow A3 may be provided through the second platform 404. As will be discussed in greater detail herein, one or more of the first, second, and third airflows A1,A2,A3 may be discontinued at certain times during the assembly process to allow for movement of sheets of material away from the table component 400.

Turning to FIG. 9B, a first clamp 616 can be provided adjacent to the first longitudinal edge 505 of the starter sheet of material 502 that overlies the top surface of the second platform 404. While the starter sheet of material 502 is clamped to the second platform 404, a tendon 503A may be attached to the portion of the first sheet of material 502 that overlies the movable extension 414 of the first platform 402. As noted above, the tendon 503A can be positioned along the indicator, which can help to position the tendon 503A proximate to a centerline of the first gore when completed. During this stage of assembly, the first, second, and third airflows A1,A2,A3 can help to secure the entire starter sheet of material 502 to the table component 400. In other examples, the starter sheet of material 502 does not need to be cut.

In FIG. 9C, after the tendon 503A is secured to the starter sheet of material 502, extra material from the starter sheet of material 502 that overlies the second platform 404 may be cutaway, for example, using a cutting element 618. This excess material may be cut way so that an initial edge of the starter sheet of material 502 can be formed into the shape of an individual envelope gore. The cutting element 618 can be attached to the heat sealing device 462, as previously discussed, or may be a cutting element that is separate from the heat sealing device 462.

The second platform 404 can move laterally in a direction LD1 away from the first platform 402 so that the first longitudinal edge 505 of the starter sheet of material 502 is transferred to the third platform 406, as shown, for example, in FIG. 9D. The air flow to the second platform 404 can be temporarily discontinued (for instance, A3 is no longer shown in FIG. 9D) or reduced and the first clamp 616 can be removed to allow movement of the first longitudinal edge 505 of the first sheet of material 502 away from the second platform 404 and toward the third platform 406. In other words, the first longitudinal edge 505 drops down from the second platform 404 and onto the third platform 406. Airflow A2 to the movable extension 414, as well as airflow A1 to the primary receiving area 412 can be maintained during this part of the process to prevent the first sheet of material 502 overlying the first platform 402 from moving toward the third platform 406.

As shown in FIG. 9E, the second platform 404 may be moved back toward the first platform 402 in the direction LD2. A second clamp 620 may also be provided at the second longitudinal edge 507 of the starter sheet of material 502 to allow the second longitudinal edge 507 of the starter sheet of material 502 to be gripped.

The second longitudinal edge 507 of the starter sheet of material 502 may be folded over the tendon. As shown, for example, in FIG. 9F, the second clamp 620 and the second longitudinal edge 507 of the starter sheet of material 502 can be lifted over the tendon 503A and onto the second platform 404. The second clamp 620 may be attached to a same or similar movable gantry which will physically transfer the clamp 620 and the second longitudinal edge 507 from the first platform 402 to the second platform 404 (as can be seen between FIGS. 9E and 9F). To help facilitate movement of the second longitudinal edge 507, the airflow A1 to the primary receiving area 412 of the first platform 402 may be temporarily discontinued, while the airflow A2 through the movable extension 414 is maintained. This overall movement causes the starter sheet of material 502 to be folded over the tendon. In this instance, the starter sheet of material is folded in half.

Once the second clamp 620 and the second longitudinal edge 507 of the starter sheet of material 502 are positioned on the second platform 404, the clamp 620 may be removed. As shown in FIG. 9G, the airflow A3 to the second platform 404 can be provided to temporarily hold the second longitudinal edge 507 of the starter sheet of material 502 to the second platform 404. The airflow A2 to the movable extension 414, however, can be discontinued and the movable extension 414 can be rotated toward the third platform 406 so that the tendon 503A is no longer supported by the movable extension 414. Without the support of the movable extension 414, as shown in FIG. 9H, the tendon 503A with attached starter sheet of material 502 can fall toward the third platform 406, while the second longitudinal edge 507 of the starter sheet of material 502 remains secured to the second platform 404 via the clamp 620 and airflow A3. The movable extension 414 can then be moved back to its original position adjacent the primary receiving area 412. The starter sheet of material 502 overlying the third platform 406 and the starter sheet of material 502 extending from the second platform 404 to the tendon 503A forms the first gore 622.

This process can be repeated again to form a second gore, but with an additional heat sealing step to join the first and second gores together. For instance, a second gore can be formed by feeding a second sheet of material 626 across the first platform 402, the second platform 404, and the opening 450 extending between the first and second platforms 402, 404, as shown in FIG. 9I. In this part of the process, the first longitudinal edge 628 of the second sheet of material 626 will overlie both the second platform 404, as well as the second longitudinal edge 507 of the starter sheet material 502. The clamp 616 may be again used to secure the first longitudinal edge 628 of the second sheet of material 626 and the second longitudinal edge 507 of the starter sheet of material 502 to the second platform 404.

The vacuum created by the third airflow A3 as well as the first clamp 616 positioned on top of the length of the first sheet of material 502, can temporarily secure the second sheet of material 626 to the starter sheet of material 502. Airflows A2 and A3 may also be maintained. Once a second tendon 603A is laid out and attached to the second sheet of material 626 overlying the movable extension 414, as previously described, the second sheet of material 626 and the starter sheet of material 502 can be heat sealed together, as shown in FIG. 9J. The sealing device 462 may include a sealing head, as previously discussed above, which can move along the length L of the second platform 404 to seal the second and starter sheets of material 502,626 together. The sealing device 462 can heat seal the second and starter sheets of material 502,626 together in the shape of the edge of the balloon gore. Excess balloon material may be simultaneously cut while the sealing device 462 moves along the length L of the table component 400 or cut thereafter.

The remaining process steps can then be repeated again. For example, as shown in FIG. 9K, the second platform 404 may be moved in a lateral direction LD1 away from the first platform 402, so as to increase the size of the opening 450 between the first and second platforms 402,404. This will cause the heat sealed first starter sheet of material 502 and second sheet of material 626 to be moved to the third platform 406. The second platform 404 can be moved back into its original and stationary position by moving in the lateral direction LD2, as shown in FIG. 9L. The second clamp 620 can be applied at or adjacent to the second longitudinal edge 630, as shown in FIG. 9M, to allow for transfer of the second longitudinal edge 630 of the second sheet of material 626 over the second tendon 603A and onto the second platform 404, as shown in FIG. 9N. As previously described, airflow A1 to the primary receiving area 412 can be discontinued, while airflow A2 to the movable extension 414 is maintained. This can help to facilitate movement of the second sheet of material 626 overlying the primary receiving area 412 away from the first platform 404. Once the second clamp 620 is removed, as shown in FIG. 9O, the movable extension 414 can be moved in a direction toward the third platform 406 so that the second tendon 603A is no longer supported by the third platform 406. The third airflow A3 in the second platform 404 will secure the second end 630 of the second sheet of material 626 to the second platform 404 as the tendon 603A and the second sheet of material to which it is attached falls to the third platform 406. Movement of the movable extension 414 increases the size of the opening between the first and second platforms 402,404 so that the tendon is dropped down to the third platform 406. The second longitudinal edge 630 of the second sheet of material 626 can remain secured to the second platform 402 by the airflow A3, as shown in FIG. 9P. The process steps 9I-9M can then be repeated to create a third gore, that will be joined to the first and second gores. The process steps can be continually repeated until the desired number of gores is completed.

To complete the gore assembly process, the first gore 622 and the last gore (not shown) may be heat sealed together. Once the desired number of gores is created, all of the gores may be stacked onto the third platform 406. The first gore 622 will be positioned at the bottom of the stack of gores closest to the third platform 406. The edge of the first gore 622 may be pulled out from underneath the stack and upward to the second platform 404. The airflow A3 can again hold the edge of the first gore 622 to the second platform 404. The edge of the top most gore (not shown) can then be placed onto the second platform 404, and the first gore and the last gore may be heat sealed together. The process of heat sealing the first gore 622 and last gore together can be done manually by an operator. Optionally, some or all of this part of the process can be automated.

Figure 10A:
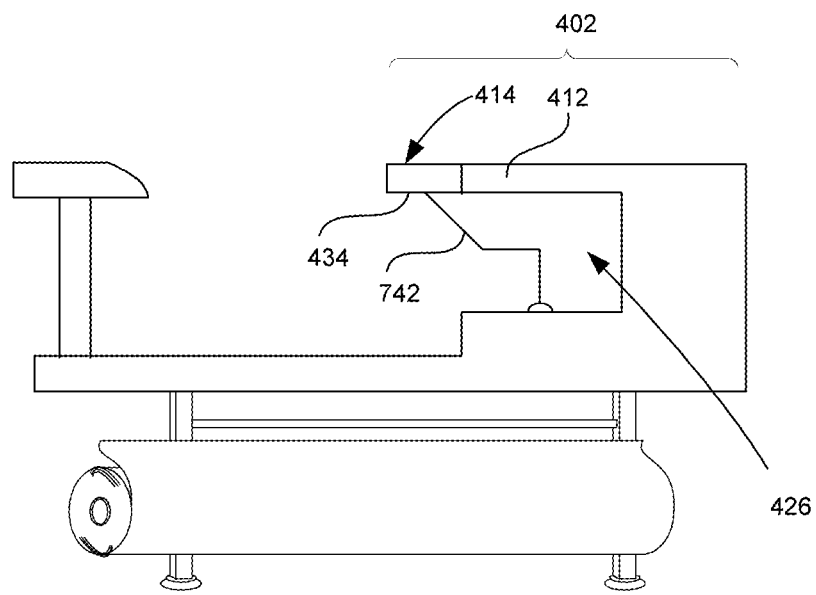
FIGS. 10A-10C provide another example of a table component in accordance with aspects of the present disclosure.
Figure 10B:
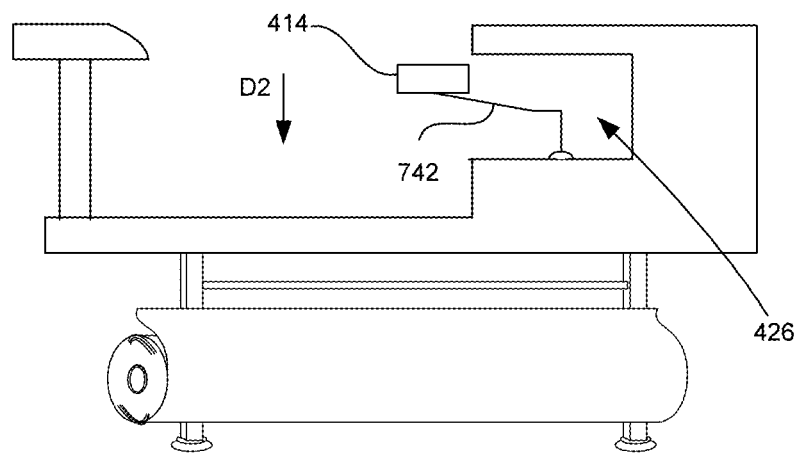
Figure 10C:
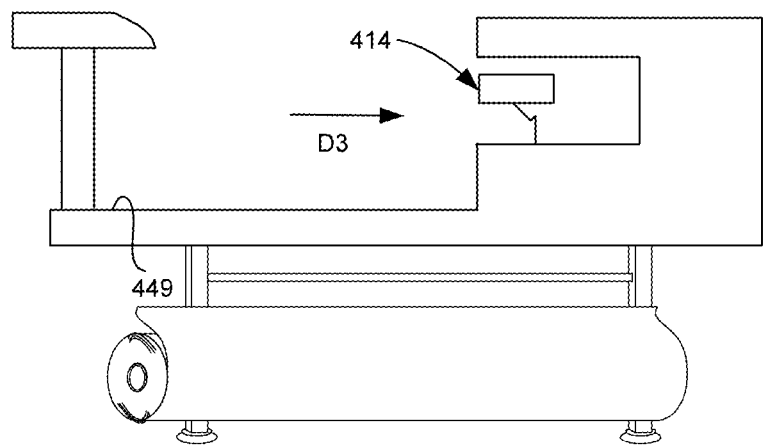

The aforementioned processes and structure provide one example of assembling a balloon envelope. Numerous other configurations can additionally or alternatively be utilized to allow for folding of an individual balloon gore, as well as transferring the balloon material from the first and second platforms to the third platform. FIGS. 10A-10C illustrate another example of a mechanism that can provide for movement of the movable extension 414 of the first platform 402. As shown, the movable extension 414 is configured so that the movable extension 414 can be moved into the recess 426 and positioned within the main body of the primary receiving area 412. For example, as shown in FIG. 10A, a mechanical arm may 742 extend from a bottom surface of the recess 426 to a bottom surface 434 of the movable extension 414 of the first platform 402. The mechanical arm 742 may be configured to move the movable extension 414 in multiple directions, such as up, down, right, and left. In the stationary or fixed position, the mechanical arm 742 is fully extended and secures the movable extension 414 in place and adjacent the primary receiving area 412. To position the movable extension 414 within the recess 426, the mechanical arm 742 can be configured to move the movable extension 414 from a first stationary position to a second stored position.

As shown in FIG. 10B, the mechanical arm 742 may move the movable extension 414 in a vertical downward direction D2 until the movable extension 414 is adjacent the recess 426. The movable extension 414 may then be moved in a lateral direction D3, as shown in FIG. 10C, that positions the movable extension 414 within the recess 726. When it is desired to return the movable extension 414 to its original position adjacent the primary receiving area 412, the arm 742 can reposition the movable extension 414 so that it is coplanar with the primary receiving area 412 of the first platform 702. In still another instance, the mechanical arm 742 may be rotatably attached to the movable platform. Instead of the arm 742 positioning the movable extension 414 within the recess 426, the movable platform 414 can instead cause the movable platform 414 to rotate about the arm in a direction toward the third platform 406.

Figure 11:
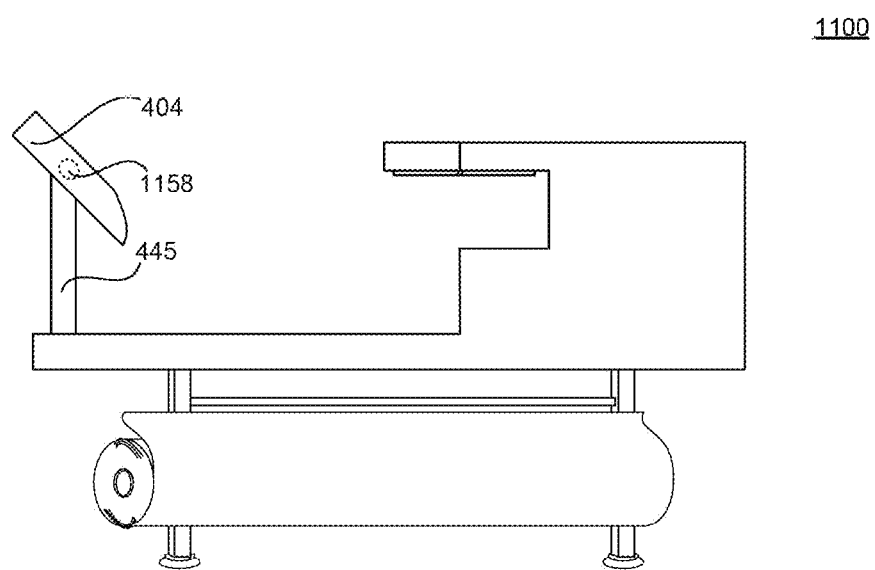
FIG. 11 is yet another example of a table component in accordance with aspects of the present disclosure.

The second platform can also be configured to move relative to the third platform and first platform in numerous alternative configurations. As shown, in the example 1100 of FIG. 11, another table component 1102 is illustrated which is similar to the embodiment of FIG. 4, but differs only with regard to the mechanism used to move the second platform 404. In this instance, the second platform 404 may be rotatable. The second platform 404 can rotate about a post 1158 extending from the legs 445 in a downward direction toward the third platform 406. This downward movement can cause the transfer of balloon material disposed on the second platform 804 from the second platform to the third platform.

Figure 12:
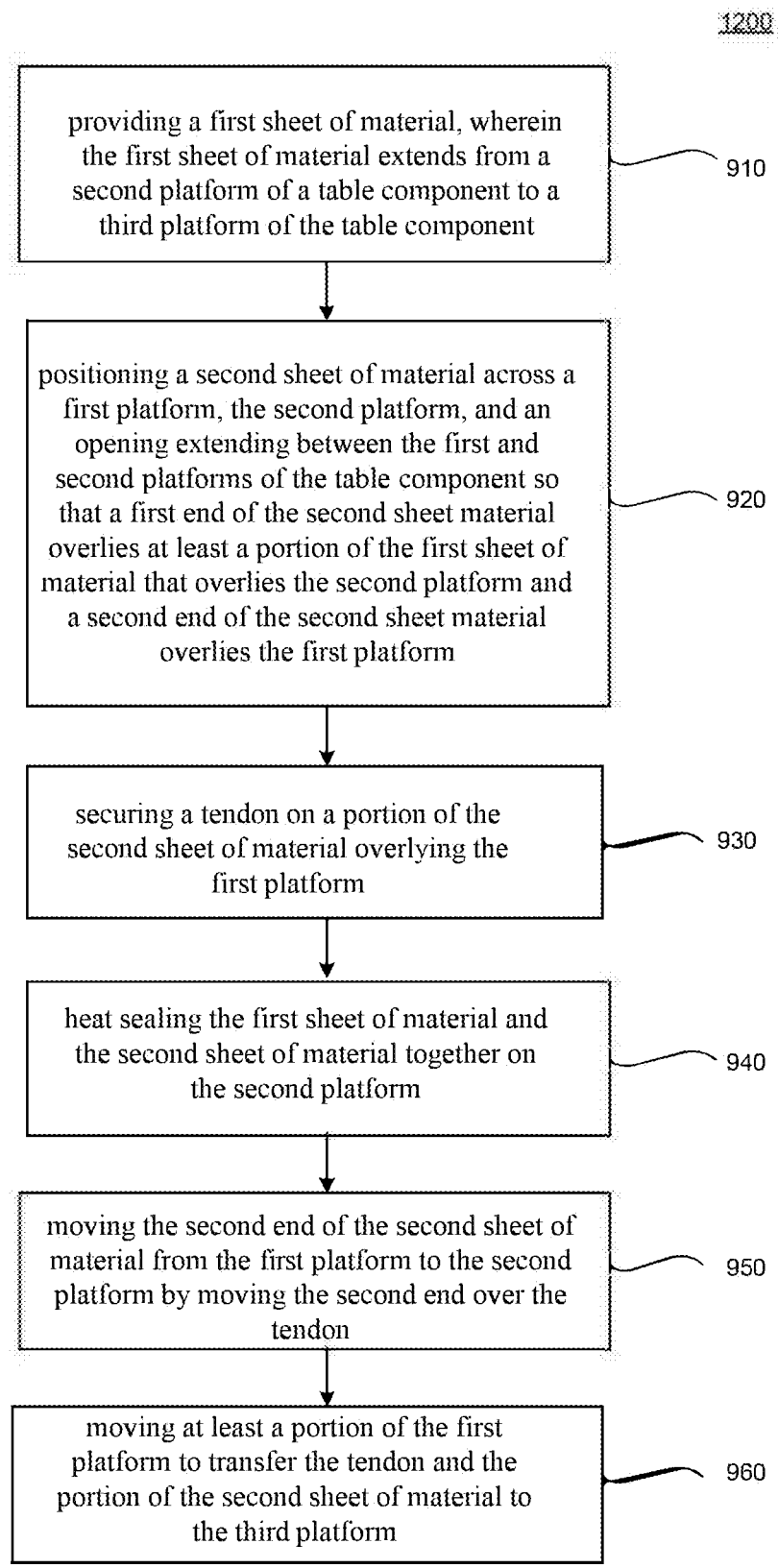
FIG. 12 is an example of a flow diagram in accordance with aspects of the present disclosure.

An example flow diagram of a method 1200 for assembling a balloon envelope is illustrated in FIG. 12. At block 910, a first sheet of balloon material, wherein the first sheet of balloon material extends from a second platform of a table component to a third platform of the table component. A second sheet of material may be positioned across a first platform, the second platform, and an opening extending between the first and second platforms of the table component, at block 920, so that a first end of the second sheet material overlies at least a portion of the first sheet of material that overlies the second platform and a second end of the second sheet material overlies the first platform. A tendon may be secured to a portion of the second sheet of material overlying the first platform at block 930. The first sheet of material and the second sheet of material may be heat sealed together on the second platform at block 940. At block 950, the second end of the second sheet of material may be moved from the first platform to the second platform by moving the second end over the tendon. At least a portion of the first platform may be moved to transfer the tendon and the portion of the second sheet of material to the third platform at block 960.

While certain processes in accordance with example implementations are shown in the figures as occurring in a linear fashion, this is not a requirement unless expressly stated herein. Different processes may be performed in a different order or concurrently.

The example embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same or similar reference numbers in different drawings can identify the same or similar elements.

The invention claimed is:

1. A system for manufacturing an envelope, the system comprising:
a table component having:
a control unit,
a first platform including a portion and a first receiver;
a second platform
a third platform,
wherein each of the first platform and the second platform are arranged above and at least partially over the third platform,
wherein the portion is configured to move relative to the third platform in order to allow envelope material to move from the first platform to the third platform, and
wherein the control unit is configured to send signals to the first receiver in order to control movement of the portion of the first platform.

2. The system of claim 1, further comprising a sealing component, the sealing component being configured to move along the second platform and to apply a heat seal to portions of the envelope material.

3. The system of claim 1, wherein the second platform includes a heat-resistant surface.

4. The system of claim 3, wherein the heat-resistant surface is a curved strip.

5. The system of claim 4, wherein the second platform further includes a curved edge having a first curve corresponding to a second curve of the curved strip.

6. The system of claim 5, wherein the curved edge is sloped and extends in a direction towards the third platform.

7. The system of claim 1, wherein the portion of the first platform is arranged to move relative to the third platform by rotating about a hinge.

8. The system of claim 1, wherein the second platform is movable relative to the third platform.

9. The system of claim 8, wherein the second platform is movable towards and away from the first platform.

10. The system of claim 1, wherein the second platform is supported by one or more legs.

11. The system of claim 10, wherein the one or more legs is a single wall attached to each of the first platform and the third platform.

12. The system of claim 10, wherein at least one of the one or more legs includes a rolling post arranged within an interior portion of the second platform.

13. The system of claim 12, wherein the interior portion includes a track, and wherein the rolling post is configured to move along the track.

14. The system of claim 1, further comprising one or more air systems arranged within each of the first platform and the second platform and configured to temporarily hold envelope material to the table component.

15. The system of claim 1, wherein the second platform includes a curved edge oriented towards a linear edge of the first platform.

16. The system of claim 1, wherein the second platform includes a second receiver, and the control unit is further configured to send signals to the second receiver in order to control movement of the second platform relative to the first platform.

17. The system of claim 1, wherein the envelope material corresponds to a portion of a balloon envelope.

18. The system of claim 1, wherein the second platform includes an indicator that marks a position for placing a tendon during the manufacturing of the envelope.

19. The system of claim 1, wherein the second platform includes a channel for positioning a tendon during the manufacturing of the envelope.

\* \* \* \* \*

UNITED STATES PATENT AND TRADEMARK OFFICE
CERTIFICATE OF CORRECTION

PATENT NO.         : 10,780,648 B1
APPLICATION NO.    : 16/563137
DATED              : September 22, 2020
INVENTOR(S)        : Daniel Henry Fourie Page 1 of 1

It is certified that error appears in the above-identified patent and that said Letters Patent is hereby corrected as shown below:

In the Claims

Claim 1, Column 20, Line 9:
Now reads "a control unit,"; should read -- a control unit; --

Claim 1, Column 20, Line 11:
Now reads "a second platform"; should read -- a second platform; and --

Signed and Sealed this
Twenty-second Day of December, 2020

Andrei Iancu
*Director of the United States Patent and Trademark Office*